(12) United States Patent
Asami

(10) Patent No.: US 7,158,151 B2
(45) Date of Patent: *Jan. 2, 2007

(54) INFORMATION PROCESSING APPARATUS, INFORMATION PROCESSING METHOD, PROGRAM STORAGE MEDIUM AND PROGRAM

(75) Inventor: Akiko Asami, Shizuoka (JP)

(73) Assignee: Sony Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/076,165

(22) Filed: Mar. 9, 2005

(65) Prior Publication Data

US 2005/0162444 A1 Jul. 28, 2005

Related U.S. Application Data

(62) Division of application No. 09/922,191, filed on Aug. 3, 2001, now Pat. No. 6,882,350.

(30) Foreign Application Priority Data

Aug. 7, 2000 (JP) ............................ P2000-239067

(51) Int. Cl.
G09G 5/00 (2006.01)
(52) U.S. Cl. ........................ 345/629; 345/419; 345/638
(58) Field of Classification Search .................... None
See application file for complete search history.

(56) References Cited

U.S. PATENT DOCUMENTS

| | | | | |
|---|---|---|---|---|
| 6,144,956 A | * | 11/2000 | Yajima et al. | 707/3 |
| 6,222,557 B1 | * | 4/2001 | Pulley et al. | 345/622 |
| 6,437,797 B1 | * | 8/2002 | Ota | 345/638 |
| 6,515,659 B1 | * | 2/2003 | Kaye et al. | 345/419 |
| 6,882,350 B1 | * | 4/2005 | Asami | 345/638 |

* cited by examiner

*Primary Examiner*—Mark Zimmerman
*Assistant Examiner*—David Chu
(74) *Attorney, Agent, or Firm*—Lerner, David, Littenberg, Krumholz & Mentlik, LLP

(57) ABSTRACT

An information processing apparatus and method are provided by which the user not only can merely see an album display but also can enjoy the album display satisfactorily as a memory. Image data are stored, and time information and position information are recorded in connection with the image data. Thumbnail icons representative of the image data are displayed in accordance with the time information, and a map image is displayed in concave/concave display. Position icons representative of the time information and the position information are displayed on the map image. The map and the thumbnail icons are moved on the display by at least one of different types of movement including horizontal movement, vertical movement, clockwise or counterclockwise rolling movement, upward or downward pitching movement and leftward or rightward yawing movement so that the user can enjoy various images.

7 Claims, 19 Drawing Sheets

FIG. 8

| THUMBNAIL ID | LATITUDE-LONGITUDE | IMAGE PICKUP DATE-TIME |
|---|---|---|
| XXX00013 | XX° XX' XX"/XX° XX' XX" | 10/10/1999·14:24 |
| XXX00014 | XX° XX' XX"/XX° XX' XX" | 10/10/1999·14:28 |

INFORMATION PROCESSING APPARATUS, INFORMATION PROCESSING METHOD, PROGRAM STORAGE MEDIUM AND PROGRAM

CROSS-REFERENCE TO RELATED APPLICATIONS

The present application is a divisional application of application Ser. No. 09/922,191 filed Aug. 3, 2001, now U.S. Pat. No. 6,882,350, the disclosure of which is hereby incorporated by reference herein, and claims priority from Japanese Application No. 2000-239067 filed Aug. 7, 2000.

BACKGROUND OF THE INVENTION

This invention relates to an information processing apparatus, an information processing method, a program storage medium and a program, and more particularly to an information processing apparatus, an information processing method, a program storage medium and a program wherein stored image data are displayed in various display manners in connection with a map to make an observer feel happy.

As one of techniques of managing photograph images stored as digital data, a technique is known wherein map data and photograph data are combined. According to this technique, positions on a map and picked up photograph images are stored in a connected relationship with each other into an apparatus such as, for example, a computer, and the map is displayed on the screen of a display unit provided for the apparatus such as a computer. Then, if a point at which a photograph was taken is designated on the map, then the photograph image picked up at the designated point is displayed as an image of a reduced size (such an image is hereinafter referred to as thumbnail icon) in the proximity of the designated point.

Such thumbnail icons representative of image data and position icons representative of positions on the map are displayed in a corresponding relationship to each other, and if a certain position icon is selected, then a corresponding thumbnail icon is displayed, or if a certain thumbnail icon is selected, then a corresponding position icon is displayed. Thus, a large amount of image data can be managed readily and displayed intelligibly.

However, although each position icon includes position information of photographing, it does not include time series information representative of the time of image pickup, and indicates only a point. Therefore, if the user wants to know image pickup time information, then the user must perform another screen operation of selecting a thumbnail icon to obtain image pickup time information or the like.

Further, since the technique described above does not involve display means for implementing such a function as to display the place and the time of image pickup on an actual map as a memory, it merely displays picked up photographs as an album and cannot allow the user to enjoy the display satisfactorily.

SUMMARY OF THE INVENTION

It is an object of the present invention to provide an information processing apparatus, an information processing method, a program storage medium and a program by which a large amount of image data can be managed readily and a screen of a high design performance can be displayed.

It is another object of the present invention to provide an information processing apparatus, an information processing method, a program storage medium and a program by which the user not only can merely see an album display but also can enjoy the album display satisfactorily as a memory.

In order to attain the objects described above, according to the present invention, a three-dimensional map image of a high design performance on which a topography is displayed in a concave/convex configuration or three-dimensionally is displayed, and together with the map image, position icons having image pickup time information are displayed in a time series at portions in the air of the map image.

Further, an actual map is displayed as a three-dimensional topography and memories upon image pickup are represented making use of the time axis thereby to make it possible to apply such complicated representations as to display a three dimensional display at various angles to an album display so that the user can not only merely look at the album display but also enjoy it satisfactorily as its memories.

It is to be noted that the term "thumbnail icon" is used in the present specification to include image information which can be recognized visually, and the term "icon" is used to include which has some information such as management information, position information or time information but does not include image information.

In particular, according to an aspect of the present invention, there is provided an information processing apparatus, comprising display means, image data inputting means for inputting image data, time information inputting means for inputting time information in connection with the image data, position information inputting means for inputting position information in connection with the image data, map display control means for controlling display of a map image, position icon display control means for controlling display of position icons indicative of the time information and the position information on the map image whose display is controlled by the map display control means, and concave/convex display control means for controlling topographic concave/convex display of the map image whose display is controlled by the map display control means.

According to another aspect of the present invention, there is provided an information processing method for an apparatus which includes display means, comprising an image data inputting step of inputting image data, a time information inputting step of inputting time information in connection with the image data, a position information inputting step of inputting position information in connection with the image data, a map display control step of controlling display of a map image, a position icon display control step of controlling display of position icons indicative of the time information and the position information on the map image whose display is controlled by the map display control step, and a concave/convex display control step of controlling topographic concave/convex display of the map image whose display is controlled by the map display control step.

According to a further aspect of the present invention, there is provided an information storage medium on which a computer-readable program is recorded, the computer-readable program causing a computer to execute an image data inputting step of inputting image data, a time information inputting step of inputting time information in connection with the image data, a position information inputting step of inputting position information in connection with the image data, a map display control step of controlling display of a map image, a position icon display control step of controlling display of position icons indicative of the time information and the position information on the map image whose display is controlled by the map display control step, and a concave/convex display control step of controlling topographic concave/convex display of the map image whose display is controlled by the map display control step.

According to a still further aspect of the present invention, there is provided a program for causing a computer to function as image data inputting means for inputting image data, time information inputting means for inputting time information in connection with the image data, position information inputting means for inputting position information in connection with the image data, map display control means for controlling display of a map image, position icon display control means for controlling display of position icons indicative of the time information and the position information on the map image whose display is controlled by the map display control means, and concave/convex display control means for controlling topographic concave/convex display of the map image whose display is controlled by the map display control means.

In the information processing apparatus, information processing method, information storage medium and program, a false three-dimensional map image wherein a concave/convex geometry is represented on a map image is displayed, and position icons displayed in the map image have time information and can be displayed in a time series.

Thus, with the information processing apparatus, information processing method, information storage medium and program, thumbnail icons indicative of image data and the position icons displayed in a time series on the three-dimensional map image are displayed in a corresponding relationship. If a certain arbitrary one of the position icons is selected, then a corresponding one of the thumbnail icons is displayed, or if a certain thumbnail icon is selected, then a corresponding one of the position icons is displayed. Consequently, a large amount of image data can be managed readily by the user and can be displayed in a manner superior in design and easy for the user to recognize.

Further, an actual map is displayed as a three-dimensional topography and memories upon image pickup are represented making use of the time axis thereby to make it possible to apply such complicated representations as to display a three dimensional display at various angles to an album display. Consequently, the user can not only merely look at the album display but also enjoy it satisfactorily as its memories.

The information processing apparatus, information processing method, information storage medium and program may assume the following forms.

In particular, the information processing apparatus, information processing method, information storage medium and program may further comprise thumbnail icon display control means for or a thumbnail icon display control step of controlling display of thumbnail icons indicative of the image data. This allows thumbnail icons to be displayed.

The information processing apparatus, information processing method, information storage medium and program may further comprise thumbnail icon data inputting means for or a thumbnail icon data inputting step of inputting data representative of the thumbnail icons, the map display control means or step controlling a display region of the map image based on the position information corresponding to the data representative of the thumbnail icons inputted by the thumbnail icon data inputting means or step. This makes it possible to display a display region centered at a selected position on the screen.

The information processing apparatus, information processing method, information storage medium and program may further comprise position icon data inputting means for or a position icon data inputting step of inputting data representative of the position icons, the thumbnail icon display control means or step controlling time series display of the thumbnail icons based on the time information corresponding to the data representative of the position icons inputted by the position icon data inputting means or step. This makes it possible to display the thumbnail icons to be displayed in a time series.

The information processing apparatus, information processing method, information storage medium and program may be configured such that the concave/convex display control means for or step of controlling the topographic concave/convex display of the map image controls the topographic concave/convex display based on contour data of a topography or based on arbitrary illumination direction data and shadow data associated with the illumination direction data. This makes it possible to display the map image three-dimensionally or solidly.

The information processing apparatus, information processing method, information storage medium and program may further comprise position icon time series display control means for or a position icon time series display control step of controlling time series display of the position icons in the map image based on the time information, and connection line display control means for or a connection line display control step of controlling connection line display between a plurality of ones of the position icons. This makes it possible to display position icons in a time series in the map image and connect adjacent ones of the position icons with a connection line. Thus, the continuity of the time series can be displayed visually.

The information processing apparatus, information processing method, information storage medium and program may be configured such that the map image whose display is controlled by the map display control means or step and a thumbnail icon display displayed on the map image by the thumbnail icon display control means or step are moved by at least one of types of movement including horizontal movement, vertical movement, clockwise or counterclockwise rolling movement, upward or downward pitching movement and leftward or rightward yawing movement. This makes it possible to display an image in various manners, and therefore, the user can enjoy, for example, by displaying a point of a memory.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a diagrammatic view illustrating an example of an image information table;

DESCRIPTION OF THE PREFERRED EMBODIMENT

Figure 1:
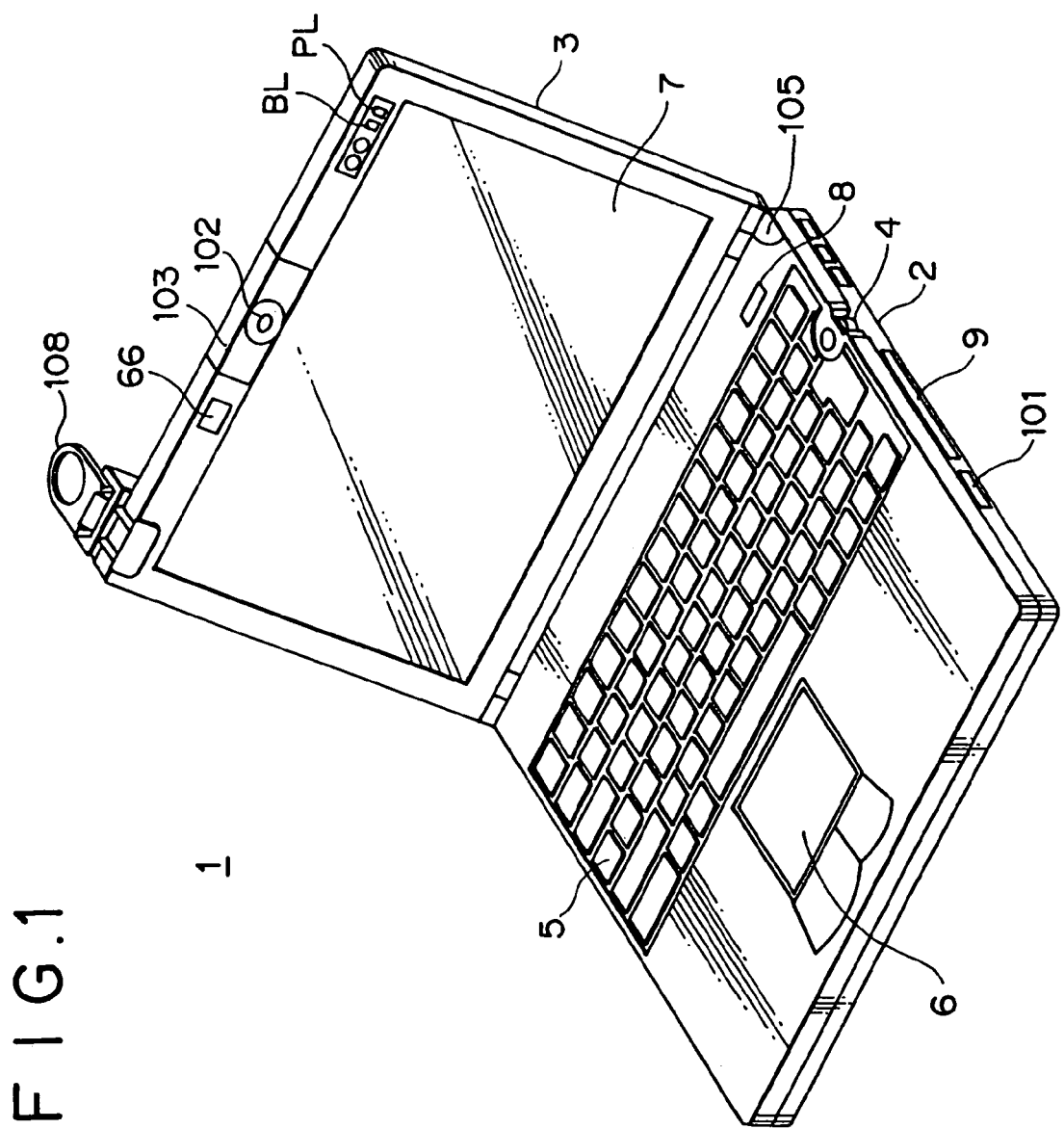
FIG. 1 is a perspective view showing an appearance of a personal computer to which the present invention is applied.
Figure 2:
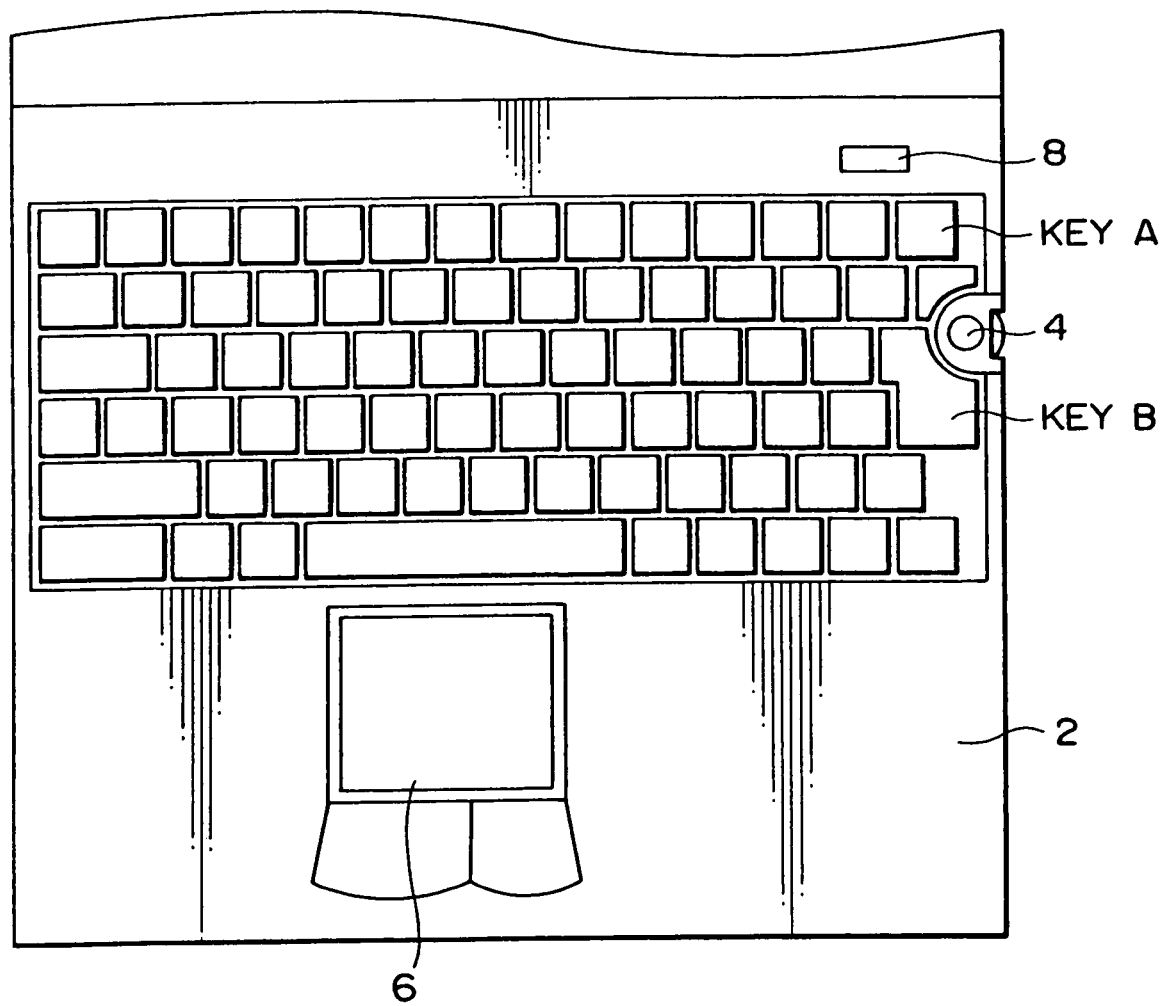
FIG. 2 is a plan view of a body of the personal computer of FIG. 1.
Figure 3:
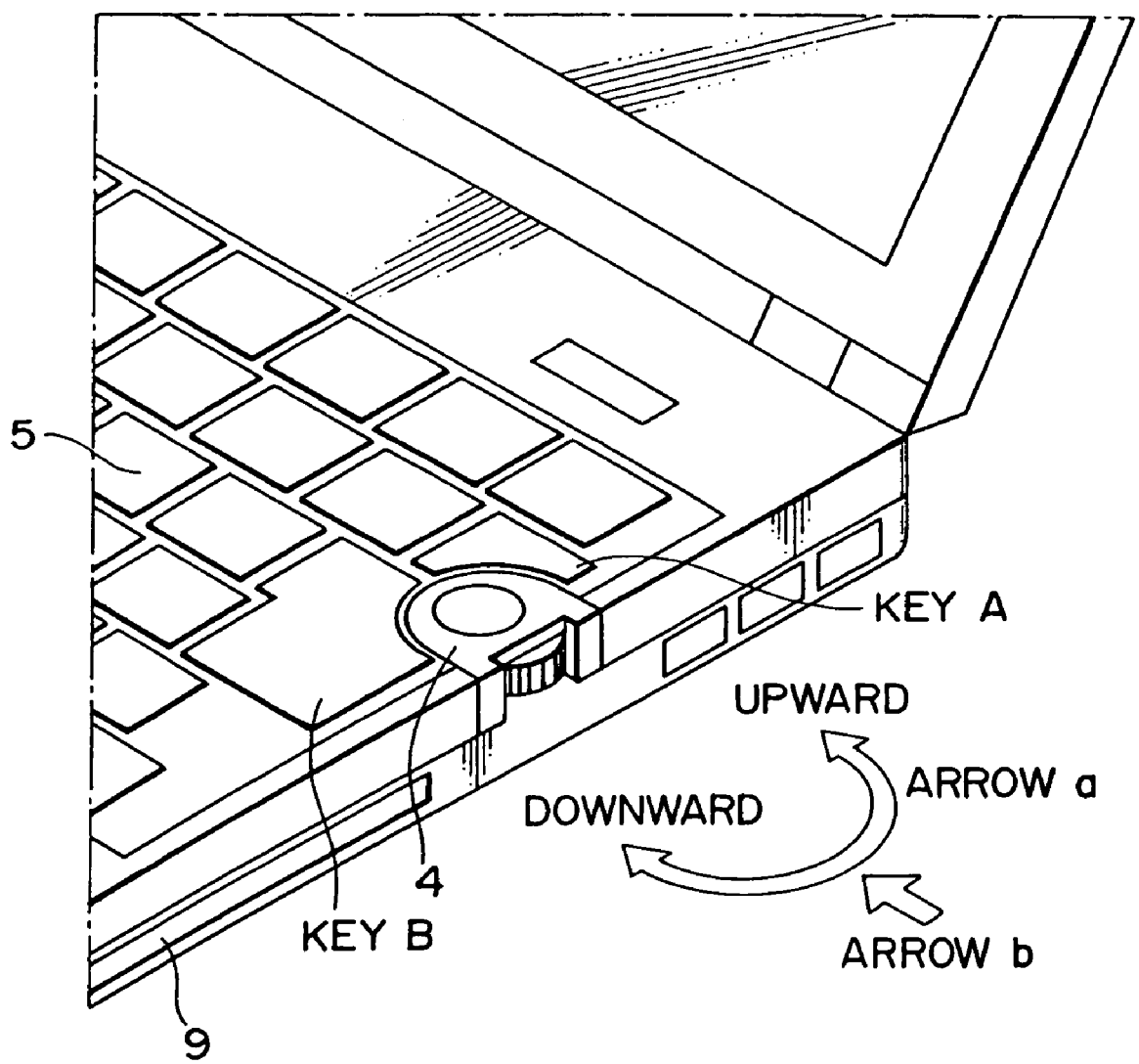
FIG. 3 is a partial enlarged perspective view showing a jog dial and neighboring elements of the personal computer of FIG. 1.
Figure 4:
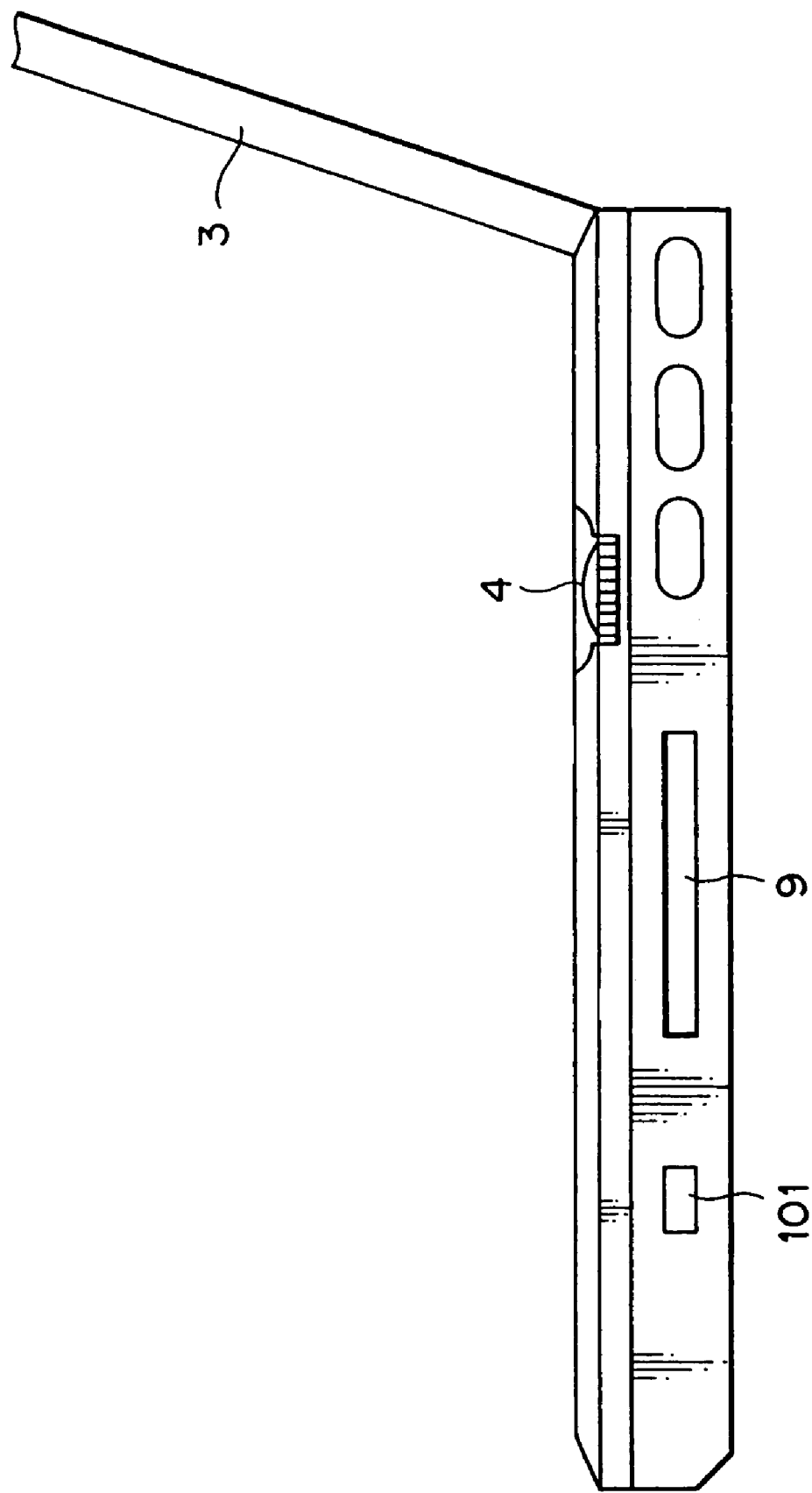
FIG. 4 is a right side elevational view showing a configuration of the right side face of the personal computer of FIG. 1.

Referring first to FIGS. 1 to 4, there is shown an appearance of a notebook type personal computer to which the present invention is applied. The notebook type personal computer shown is generally denoted at 1 and includes, as basic components, a body 2, and a display section 3 formed as a lid mounted for opening and closing pivotal motion on the body 2. In FIG. 1, the display section 3 is shown in an open state with respect to the body 2.

The body 2 has provided on an upper face thereof a keyboard 5 for being operated to input various characters and symbols, a touch pad 6 serving as a pointing device for being operated to move a pointer (mouse cursor), and a power supply switch 8. Further, the body 2 has a jog dial 4, an IEEE 1394 input/output port 101 and so forth provided on a side face thereof. It is to be noted that a pointing device, for example, of the stick type may replace the touch pad 6.

Meanwhile, the display section 3 has an LCD (Liquid Crystal Display) unit 7 provided on a front face thereof for displaying an image. The display section 3 further has, provided at a right upper portion thereof, a power supply lamp PL, a battery lamp BL, and, if necessary, a message lamp ML and other lamps which may each be in the form of an LED (light emitting diode). Furthermore, the display section 3 has, provided at an upper central portion thereof, a CCD video camera 102, which includes a CCD (Charge-Coupled Device) unit, and a microphone 104, while a shutter button 105 of the CCD video camera 102 is provided at a right upper end portion of the body 2. The CCD video camera 102 is provided on a rotational movement mechanism 103 which supports a lens section of the CCD video camera 102 for rotational motion with respect to the display section 3. It is to be noted that the power supply lamp PL, battery lamp BL, message lamp ML and so forth may otherwise be provided at a lower portion of the display section 3.

The jog dial 4 is disposed among keys of the keyboard 5 formed on the body 2 and attached so as to have a height equal to that of the keys. The jog dial 4 is used such that, when it is rotated in the direction indicated by an arrow mark a in FIG. 3, a predetermined process is executed, but when it is bodily moved in the direction indicated by another arrow mark b, another predetermined process is executed. It is to be noted that the jog dial 4 may otherwise be disposed on the left side face of the body 2, or disposed on the left or right side face of the display section 3, on which the LCD unit 7 is provided, or may otherwise be disposed in a vertical direction between the "G" key and the "H" key of the keyboard 5. Or else, the jog dial 4 may be disposed at a central portion of the front face of the touch pad 6 such that it can be operated with the thumb while the touch pad 6 is operated with the forefinger, or disposed horizontally along an upper end edge or a lower end edge of the touch pad 6, or may otherwise be disposed vertically between the right button and the left button of the touch pad 6. Further, the jog dial 4 need not be disposed vertically or horizontally, but may be disposed in an inclined direction in which it can be operated with the thumb or a suitable finger. Furthermore, the jog dial 4 may be disposed at any position on a side face of a mouse of a pointing device at which it can be operated with the thumb.

Figure 5:
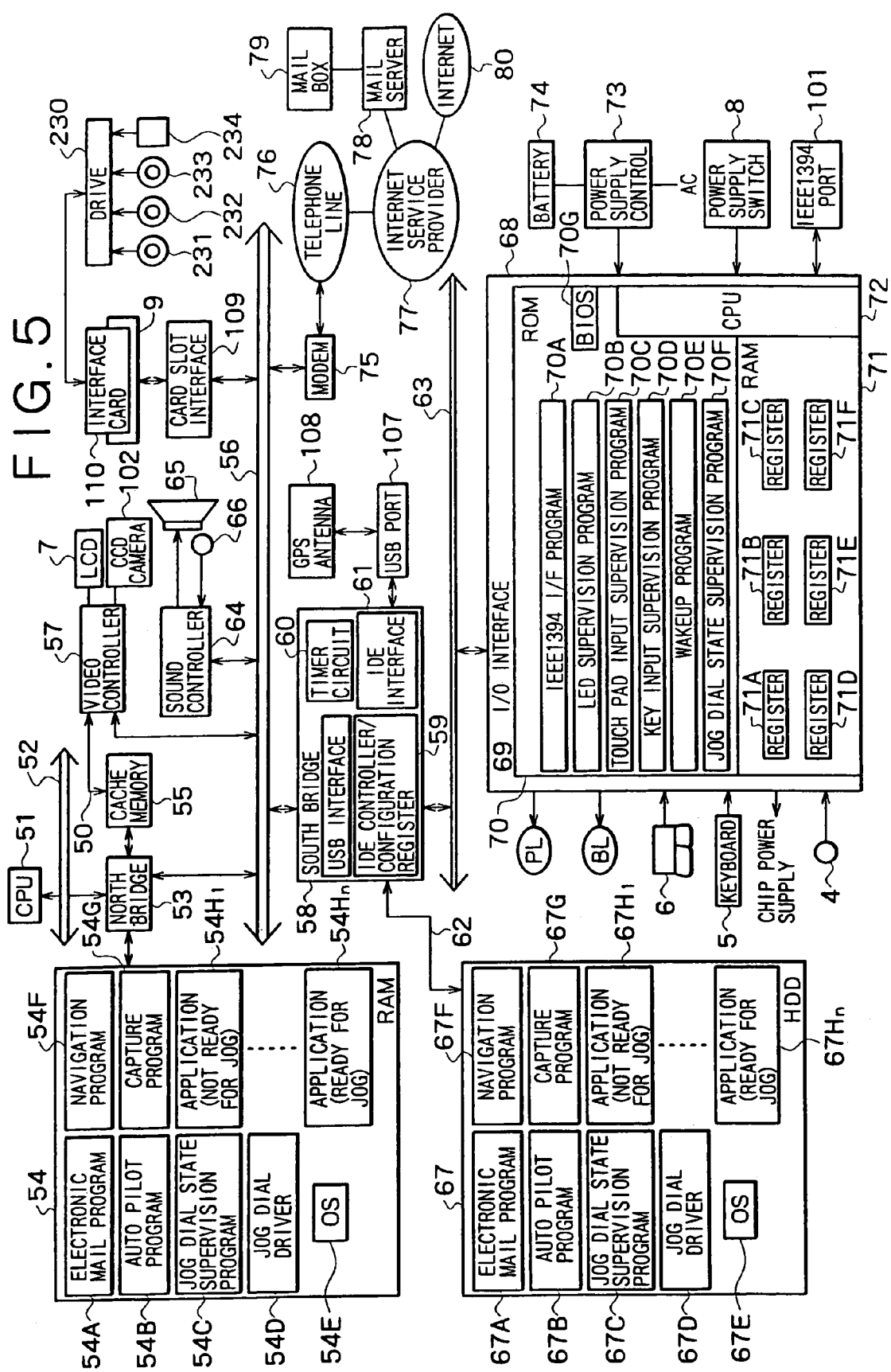
FIG. 5 is a block diagram showing an example of an internal configuration of the personal computer of FIG. 1.

FIG. 5 shows an example of internal configuration of the personal computer of FIG. 1. Referring to FIG. 5, a CPU (Central Processing Unit) 51 is formed from, for example, a Pentium (trademark) processor of Intel and connected to a host bus 52. Also a north bridge 53 is connected to the host bus 52. The north bridge 53 is connected also to an AGP (Accelerated Graphics Port) 50 and a PCI bus 56. The north bridge 53 is formed from, for example, the 400BX of Intel and controls the CPU 51, a RAM (Random Access Memory) 54 and other associated elements. Further, the north bridge 53 is connected to a video controller 57 through the AGP 50. The north bridge 53 and a south bridge 58 cooperatively form a chip set.

The north bridge 53 is further connected to the RAM 54 and a cache memory 55. The cache memory 55 caches data to be used by the CPU 51. Though not shown, also the CPU 51 has a built-in primary cache memory.

The RAM 54 may be, for example, a DRAM (Dynamic Random Access Memory) and stores programs to be executed by the CPU 51 and data necessary for operation of the CPU 51. More particularly, when startup of the notebook type personal computer 1 is completed, for example, an electronic mail program 54A, an auto pilot program 54B, a job dial state supervision program 54C, a jog dial driver 54D, an operation program (OS) 54E, a navigation program 54F, a capture program 54G and other application programs 54H1 to 54Hn are stored in the RAM 54 as a result of transfer of them.

The electronic mail program 54A is used to transmit and receive a communication text to and from a communication circuit such as a telephone circuit 76 through a modem 75 over a network. The electronic mail program 54A has a terminating mail acquisition function as a particular function. The terminating mail acquisition function executes a process of confirming whether or not a mail destined for the notebook type personal computer 1 (user) has terminated in a mail box 79 of a mail server 78 provided by an Internet service provider 77 and acquiring, if a terminating mail destined for the notebook type personal computer 1 is present, the mail.

The auto pilot program 54B successively starts up and processes a plurality of processes (or programs) set in advance in an order set in advance.

The OS (Operating System: basic program software) 54E controls basic operation of the notebook type personal computer 1 and may be any of, for example, the Windows95, Windows98, and Windows2000 (all trademarks) of Microsoft, the Mac OS (trademark) of Apple Computer and the UNIX compatible OS (Linux) for a personal computer.

The jog dial state supervision program 54C receives a notification from any of the application programs 54H1 to 54Hn of whether or not it is ready for a jog dial, and operates, if the application program is ready for a jog dial, to display operations which can be executed by an operation of the jog dial 4 to the user using a user interface function which the application program has. The job dial state supervision program 54C normally waits for an event of the jog dial 4 and has a list for reception of a notification from the application program. The jog dial driver 54D executes various functions in response to an operation of the jog dial 4.

The video controller 57 is connected to the PCI bus 56 and is further connected to the north bridge 53 through the AGP 50. Thus, the video controller 57 controls display of the LCD unit 7 based on data supplied thereto through the PCI bus 56 or the AGP 50, and sends video data from the CCD video camera 102 to the PCI bus 56 or the north bridge 53.

A sound controller 64 is connected to the PCI bus 56 and fetches a sound input from a microphone 66 or supplies a sound signal to a speaker 65. Also the modem 75 and a card slot interface 109 are connected to the PCI bus 56.

The modem 75 can be connected to a communication network 80, which may be a wired communication network or a wireless communication network such as the Internet or a packet communication network, the mail server 78 and so forth through the telephone circuit 76 and the Internet service provider 77. Further, in order to add an optional function, an interface card 110 is mounted suitably into a slot 9 connected to the card slot interface 109 so that data may be communicated with an external apparatus. For example, a drive 230 can be connected to the interface card 110, and data can be communicated with a magnetic disk 231, an optical disk 232, a magneto-optical disk 233 or a semiconductor memory 234 inserted in the drive 230.

Also the south bridge 58 is connected to the PCI bus 56. The south bridge 58 may be, for example, the PIIX4E of Intel and controls various inputs and outputs. In particular, the south bridge 58 includes an IDE (Integrated Drive Electronics) controller/configuration register 59, a timer circuit 60, an IDE interface 61 and a USB interface (Universal Serial Bus) 106, and controls devices connected to the touch pad 6, devices connected to a USB port 107 and devices connected through an ISA/EIO (Industry Standard Architecture/Extended Input Output) bus 63 and an embedded controller 68.

For example, if a GPS (Global Positioning System) antenna 108 is connected to the USB port 107, then radio waves from GPS satellites are received by the GPS antenna 108 to detect current position data. The USB interface 106 sends current position data (latitude data, longitude data and altitude data) received by the GPS antenna 108 to the CPU 51 through the PCI bus 56, north bridge 53 and host bus 52.

The IDE controller/configuration register 59 is formed from two IDE controllers including a primary IDE controller and a secondary IDE controller, a configuration register, and so forth.

The primary IDE controller is connected to a connector (not shown) by an IDE bus 62, and a hard disk drive (HDD) 67 is connected to the connector. The secondary IDE controller can be connected to an external apparatus by some other IDE bus not shown.

The HDD 67 stores thereon an electronic mail program 67A, an auto pilot program 67B, a jog dial state supervision program 67C, a jog dial driver 67D, an OS (basic program software) 67E, a navigation program 67F, a capture program 67G and a plurality of other application programs 67H1 to 67Hn, as well as data and so forth to be used by the programs. The programs 67A to 67Hn stored on the HDD 67 are successively transferred to and stored into the RAM 54 in the startup (boot-up) process. The application program 67H1 has image management software installed therein.

Further, the embedded controller 68 is connected to the ISA/EIO bus 63. The embedded controller 68 is an I/O controller formed from a microcontroller. In particular, the embedded controller 68 is formed from an I/O interface 69, a ROM 70, a RAM 71 and a CPU 72 connected to one another.

The ROM 70 has stored therein in advance, for example, an IEEE 1394 I/F (interface) program 70A, an LED supervision program 70B, a touch pad input supervision program 70C, a key input supervision program 70D, a wakeup program 70E, and a jog dial state supervision program 70F.

The IEEE 1394 I/F program 70A is used to input and output data conforming to the IEEE 1394 which are transmitted and received through the IEEE 1394 input/output port 101. The LED supervision program 70B is used to control lighting of the power supply lamp PL, the battery lamp BL, the message lamp ML when necessary and other lamps each in the form of an LED. The touch pad input supervision program 70C is used to supervise inputting by the user using the touch pad 6. The key input supervision program 70D is used to supervise inputting by the user using the keyboard 5 or other key switches. The wakeup program 70E manages various chip power supplies for checking based on current time data supplied thereto from the timer circuit 60 in the south bridge 58 whether or not a preset time comes and starting up a predetermined process (or program) when the preset time comes. The key input supervision program 70D normally supervises rotation of a rotary encoder section of or depression of the jog dial 4.

The ROM 70 has a BIOS (Basic Input/Output System) 70G written therein. The BIOS is a basic input/output system and is a software program for controlling inputting and outputting of data between the OS or an application program and a peripheral equipment (the display unit, keyboard, HDD or the like).

The RAM 71 has registers for LED control, a touch pad input status, a key input status and set times, an I/O register for supervision of the jog dial state, an IEEE 1394 I/F register and so forth as registers 71A to 71F. For example, the LED control register controls lighting of the message lamp ML for indicating an instantaneous startup state of an electronic mail when the jog dial 4 is depressed. The key input status register stores an operation key flag when the jog dial 4 is depressed. The set time register can arbitrarily set a certain time therein.

The embedded controller 68 is connected to the jog dial 4, touch pad 6, keyboard 5, IEEE 1394 input/output port 101 and shutter button 105 through the connector not shown so that, if the user performs an operation using the jog dial 4, touch pad 6, keyboard 5 or shutter button 105, then it receives a signal corresponding to the operation from the jog dial 4, touch pad 6, keyboard 5 or shutter button 105 and outputs the signal to the ISA/EIO bus 63. Further, the embedded controller 68 performs transmission/reception of data to/from an external apparatus through the IEEE 1394 input/output port 101. Furthermore, the power supply lamp PL, the battery lamp BL, a power supply control circuit 73 and the lamps each in the form of an LED are connected to the embedded controller 68.

The power supply control circuit 73 is connected to a built-in battery 74 or an AC power supply, and supplies necessary power to the individual blocks and controls charging of the built-in battery 74 and secondary batteries of peripheral equipments. Further, the embedded controller 68 supervises the power supply switch 8 which is operated to switch on or off power supply.

The embedded controller 68 can normally execute the programs from the IEEE 1394 I/F program 70A to the BIOS 70G with its internal power supply even when the power supply switch 8 is off. In particular, the IEEE 1394 I/F program 70A to the BIOS 70G are normally operating even when no window is open on the LCD unit 7 of the display section 3. Accordingly, even if the power supply switch 8 is off and the OS 54E is not operating on the CPU 51, the embedded controller 68 normally executes the jog dial state supervision program 70F and provides a programmable power key (PPK) function even if a key for exclusive use is not provided for the notebook type personal computer 1. Thus, even if the personal computer 1 is, for example, in a power saving mode or in a power supply off state, the user can start up favorable software or a favorable script file only by depressing the jog dial 4.

The method of inputting an instruction for starting up application software when the power supply switch 8 is in an on state may be, for example, to display an icon representative of startup of photograph image management software on the LCD unit 7 in advance to allow selection of the photograph image management software using the keyboard 5 or the touch pad 6 or to provide a startup button on the keyboard 5.

Now, functioning blocks when the CPU 51 of the personal computer 1 reads in and starts up the photograph image management software.

Figure 6:
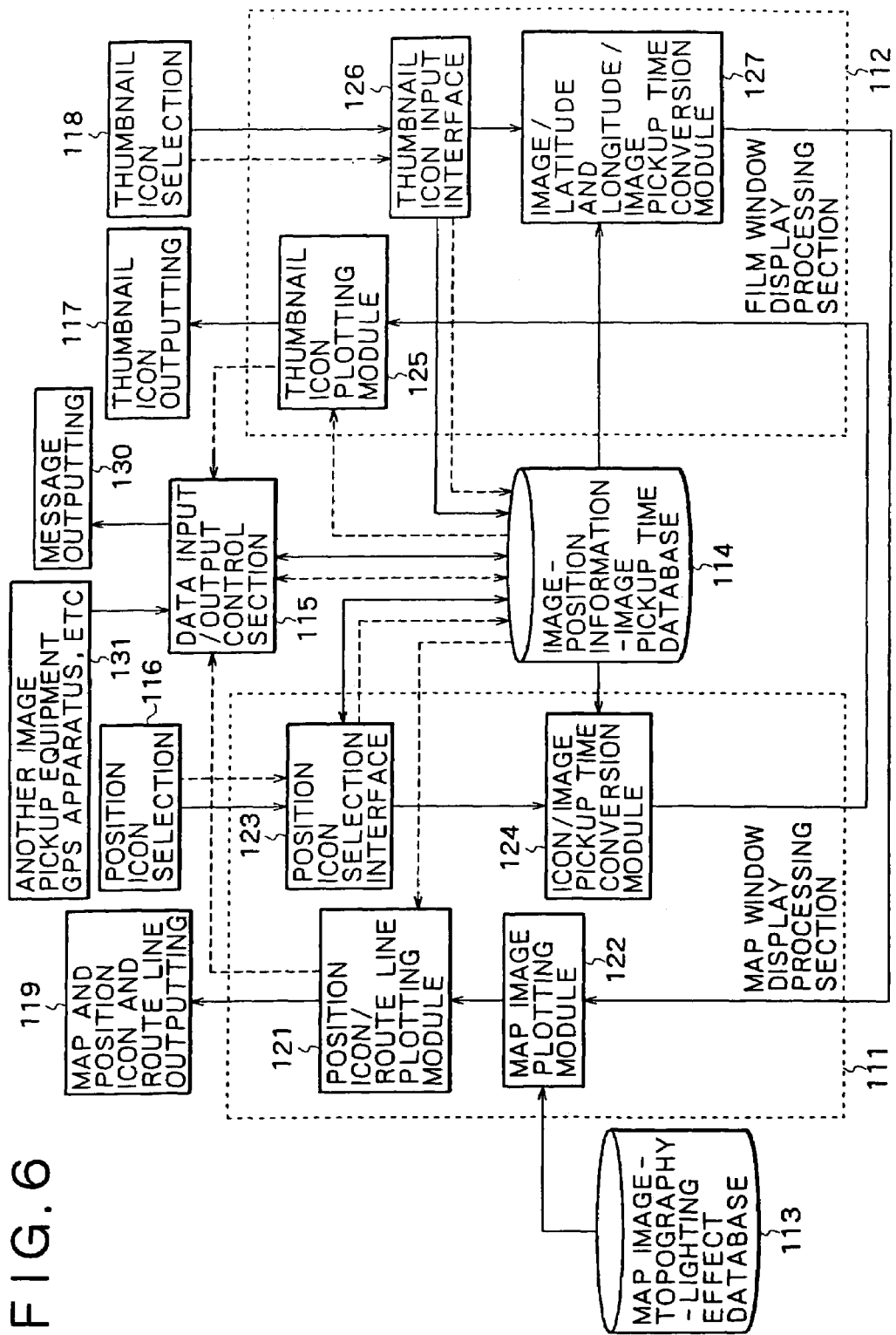
FIG. 6 is a functional block diagram showing functions of the personal computer of FIG. 1.

FIG. 6 is a functional block diagram illustrating functions of the personal computer 1 of FIG. 1. Referring to FIG. 6, a map window display processing section 111 and a film window display processing section 112 control display of a map window and a film window, respectively, which are hereinafter described with reference to FIGS. 10 to 12.

An image-position information-image pickup time database 114 outputs, in order that, when image data picked up are inputted, a message for assistance to an operation of the user may be displayed on the LCD unit 7, text data representative of the corresponding message. A data input/output control section 115 controls inputting/outputting processing of the image-position information-image pickup time database 114.

Figure 10:
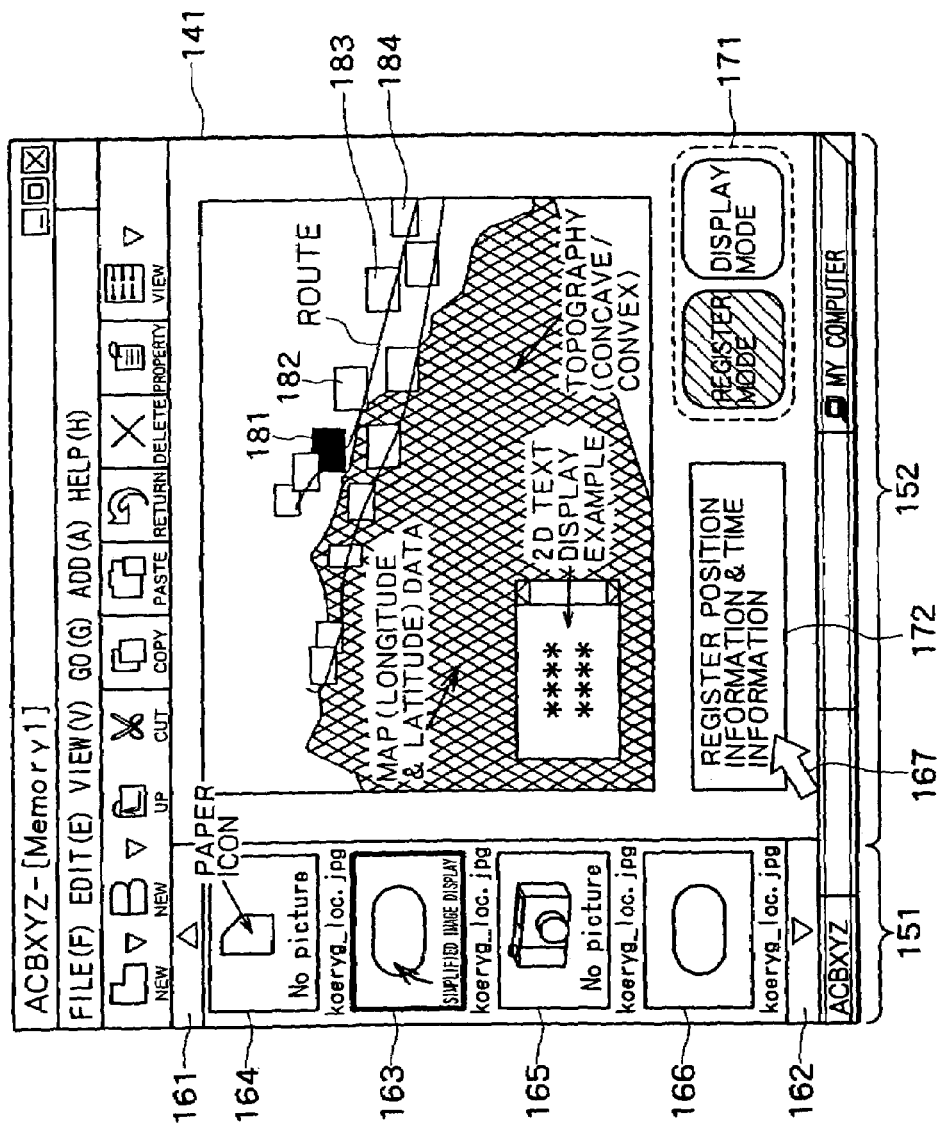
FIGS. 10 to 12 are schematic views showing a display screen.

Position icons 181 to 184 are displayed on a map in a map window 152 and connected to each other with a route line as seen in FIG. 10.

If selection 116 of a position icon is performed as seen in FIGS. 6 and 10, then a position icon selection interface 123 process is performed. Here, a mouse cursor 167 on the screen is moved by a mouse operation, and a desired one of the position icons 181 to 184 (for example, the position icon 181) is determined by double clicking by a mouse operation.

Program data of the position icon selection interface 123 stored in advance on the HDD of the personal computer 1 and data of the position icon 181 selected and determined in such a manner as described above are called by the CPU 51 (refer to FIG. 5) and written into the RAM 54. The data are processed by the CPU 51. Then, image pickup time data allocated to the position icon is called from the image-position information-image pickup time database 114 by the CPU 51.

The called image pickup time data corresponding to the position icon 181 and program data of an icon/image pickup time conversion module stored in advance on the HDD of the notebook type personal computer 1 are called and written into the RAM 54. The data are processed by the CPU 51 to determine a thumbnail icon 163.

Data of the determined thumbnail icon 163 and program data of a thumbnail icon plotting module 125 of the film window display processing section 112 are called and written into the RAM 54. The data are processed by the CPU 51 so that the thus determined thumbnail icon 163 is emphatically plotted at the top in the film window.

Contents of an image of image data corresponding to the thumbnail icon 163 plotted here are processed so that the image data may be visually confirmed simply and readily. Or, where the corresponding image data are not registered as yet, for example, a message of "No Picture" is displayed.

Further, the thumbnail icon 163 which is the determined thumbnail icon is displayed emphatically, for example, by highlight display so that it can be visually recognized readily from among a plurality of icons displayed in a film window 151. Then, the thumbnail icon 163 is outputted 117.

The thumbnail icon 163 and so forth are displayed in the film window 151. The thumbnail icon 163 and so forth are displayed in simplified images. Or, if corresponding image data is not registered as yet, then the icon is displayed, for example, as "No Picture".

If selection 118 processing of a thumbnail icon is performed, then processing of a thumbnail icon input interface 126 is performed. For example, the mouse cursor 167 on the screen is moved by a mouse operation, and, for example, the thumbnail icon 163 in the film window 151 is selected by mouse clicking. Then, the desired thumbnail icon 163 is determined by double clicking by a mouse operation.

Program data of the thumbnail icon input interface 126 stored in advance on the HDD of the notebook type personal computer 1 and data of the thumbnail icon 163 selected and determined in such a manner as described above are read out and written into the RAM 54. The data are processed by the CPU 51 so that position information data allocated to the thumbnail icon 163 is called from the image-position information-image pickup time database 114.

The called position information data corresponding to the called thumbnail icon 163 and program data of a image/latitude and longitude/image pickup time conversion module 127 stored in advance on the HDD of the notebook type personal computer 1 are called and written into the RAM 54. The data are processed by the CPU 51 to determine data of the position icon 181.

The determined position icon 181 data and program data of a map image plotting module 122 of the map window display processing section 111 are called and written into the RAM 54. The data are processed by the CPU 51 so that a map image wherein the determined position icon 181 is disposed at the central position of a display screen 141 is plotted.

From a map image-topography-lighting effect database 113, map image data, topography data, effect tool data and program data of the map image plotting module 122 are called and written into the RAM 54. The data are processed by the CPU 51 so that a three-dimensional map image of a higher design performance wherein the position icon 181 is disposed at the central position of the map is plotted.

The position icon 181 data and program data of a position icon/route line plotting module 121 are called and written into the RAM 54. The data are processed by the CPU 51. Consequently, the position icon 181 is displayed on the displayed map.

Further, although position icons are displayed on the map based on the latitude and longitude information, also arrayed display based on pickup time information is performed.

Those position icons which are adjacent to each other in a time series order are connected to each other by a route line so that the time series order of them may be confirmed readily.

Further, in order that the determined position icon 181 from among the plurality of position icons displayed in the map window 152 may be visually confirmed readily, the position icon 181 is displayed emphatically such as in highlight display. As described above, a map image, position icons and a route line are outputted 119 to the screen.

Processing of the data input/output control section 115 is described. In the display screen 141 shown in FIG. 10, a register mode is selected from mode selection buttons 171. In the register mode, image data picked up by some other image pickup apparatus is inputted to the image-position information-image pickup time database 114 under the control of the data input/output control section 115. Further, text data representative of a corresponding message is outputted from the image-position information-image pickup time database 114, and such control processing that a message output 130 which may be an assistance to a user operation is outputted through the data input/output control section 115 is performed.

Thus, registration processing of picked up image data and position information data and image pickup time data corresponding to the image data is described. First, the photograph image management software is started up, and the GPS antenna 108 is connected to the USB port 107. Radio waves from GPS satellites are received by the GPS antenna 108. When image pickup is performed using the personal computer 1, pickup position information data and pickup time data of the image data are inputted to the personal computer 1.

At this time, program data regarding the data input/output control section 115, the image data, the position information data and the image pickup time data are read in and written into the RAM 54. The data are processed by the CPU 51. The image data, position information data and image pickup time data processed in this manner are registered into the image-position information-image pickup time database 114.

Further, registration of image data obtained using an image data pickup apparatus such as a digital camera and position and time information data stored in a GPS apparatus which can recognize and store position and time information into the personal computer 1 is described.

Registration of image data into the personal computer 1 is described. First, an image data pickup apparatus is connected to the personal computer 1 through the USB port 107. Then, the photograph image management software is started up, and image data is written into the RAM 54 through the USB port 107, the south bridge 58 and the PCI bus 56.

Thereafter, the image data stored in the RAM 54 is read out and processed by the CPU 51 together with the program data regarding the data input/output control section 115. Then, a thumbnail ID is delivered to the image data by the arithmetic operation processing of the CPU 51, and the image data and the corresponding thumbnail ID are registered into the image-position information-image pickup time database 114.

Registration of position information data and image pickup time data into the personal computer 1 is described. First, the GPS apparatus is connected to the personal computer 1 through the USB port 107. Then, the photograph image management software is started up, and position information data and image pickup time data are written into the RAM 54 through the USB port 107, south bridge 58 and PCI bus 56. Thereafter, the position information data and the image pickup time data stored in the RAM 54 are read out and processed by the CPU 51 together with program data of the data input/output control section 115. The position information data and the image pickup time data processed in this manner are registered into the image-position information-image pickup time database 114.

Now, inputting (indicated by a broken line arrow mark in FIG. 6) of position information data and image pickup time data corresponding to a thumbnail icon of a predetermined image displayed in a reduced scale as a result of selection of the thumbnail icon is described. Selected thumbnail icon data and program data regarding the thumbnail icon input interface 126 are read in and written into the RAM 54. The data are processed by the CPU 51. The CPU 51 accesses the image-position information-image pickup time database 114 to search for position information data and image pickup time data corresponding to the selected thumbnail icon.

Here, if the position information data and the image pickup time data corresponding to the thumbnail icon are not registered as yet, then, for example, message data of "Please input position information and image pickup time information." is called from the image-position information-image pickup time database 114 and written into the RAM 54. Program data regarding the thumbnail icon plotting module 125 corresponding to the called message data is read in. The program data is used to display the thumbnail icon in emphatic display such as, for example, in highlight display and the operation message "Please input position information and pickup time." is displayed.

Then, program data regarding the data input/output control section 115 and the thumbnail icon data are read and written into the RAM 54. The data are processed by the CPU 51 so that the position information data and the image pickup time data corresponding to the thumbnail icon are registered into the personal computer 1 in the register mode. In the manner, the image data, position information data and image pickup time data are registered and updated into the image-position information-image pickup time database 114.

Further, a position icon on the map window 152 is selected and then dragged and dropped on the map to rewrite the position information (corresponding to a broken line arrow mark portion in FIG. 6).

The selected, dragged and dropped position icon data (data before and after the movement) and program data regarding the position icon selection interface 123 are read in and written into the RAM 54. The data are processed by the CPU 51. Then, the CPU 51 searches the image-position information-image pickup time database 114 to specify the thumbnail ID of the selected position icon data. Further, registration rewriting of the position information data and the image pickup time data corresponding to the specified thumbnail ID is performed.

When the thumbnail ID corresponding to the selected position icon is specified, if the thumbnail ID is not registered as yet, then message data of, for example, "A thumbnail ID is delivered." is called from the image-position information-image pickup time database 114. Program data regarding the position icon/route line plotting module 121 corresponding to the called message data is processed by the CPU 51. Consequently, emphatic display such as highlight display of the selected position icon is performed, and further, the operation message is displayed.

As described above, program data regarding the data input/output control section 115 and position icon data are read in and written into the RAM 54 and the data are processed by the CPU 51. Consequently, an image corresponding to the position icon is registered in the register mode and a thumbnail ID is delivered.

To make a thumbnail icon, whose image data is registered already and to which a corresponding thumbnail ID is delivered, correspond to a position icon is described. First, a desired thumbnail icon is specified by means of an upward scroll button 161 or a downward scroll button 162 in the film window 151 (refer to FIGS. 11 and 12). The specified desired thumbnail icon is selected by mouse clicking and dragged and dropped to a position icon to be made correspond thereto. The image data and the thumbnail ID corresponding to the position icon are registered in this manner. Then, the image data, position information data and image pickup time data are registered and updated into the image-position information-image pickup time database 114.

Figure 7:
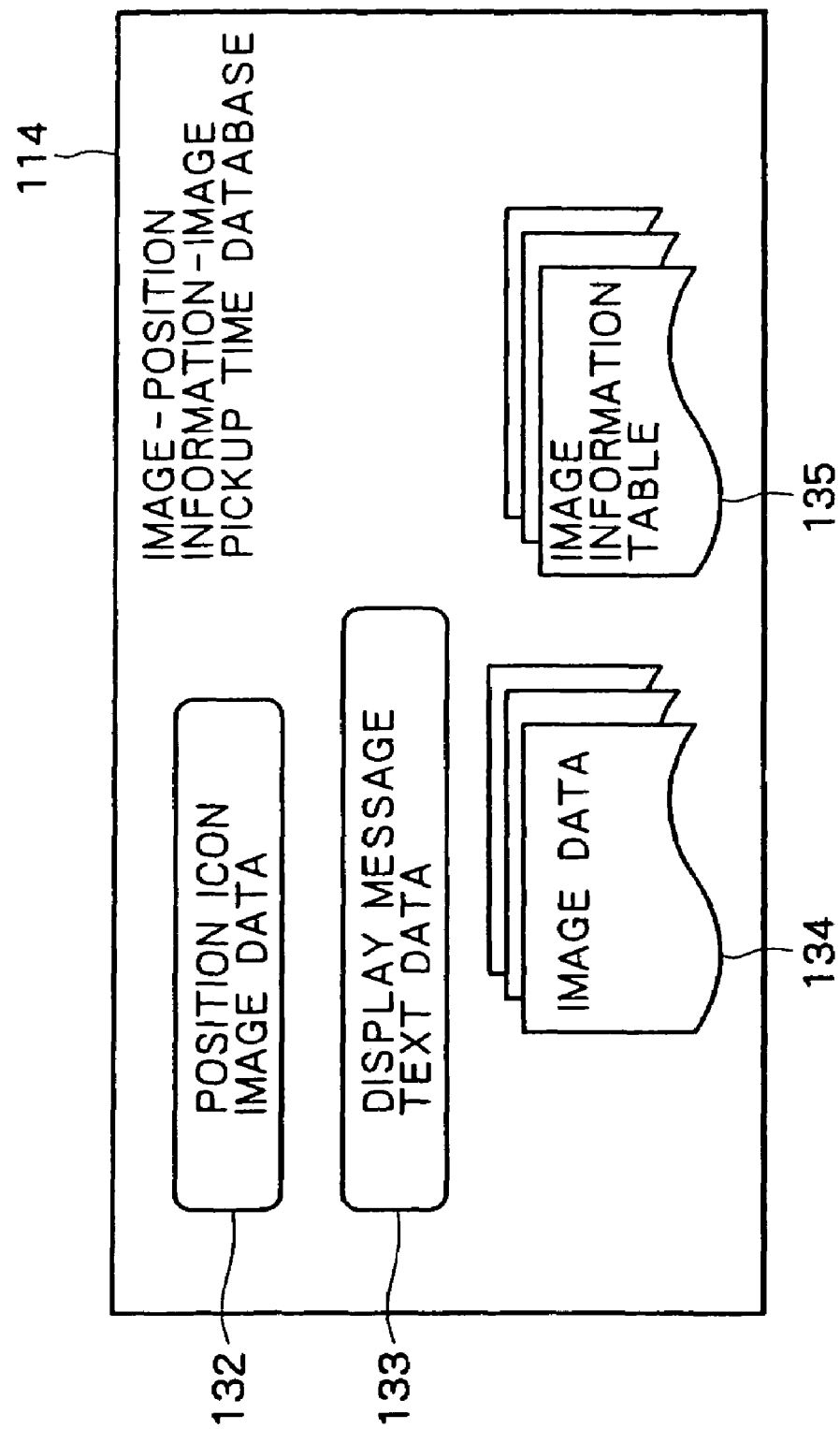
FIG. 7 is a diagrammatic view illustrating an example of information registered in an image-position information-image pickup time database.

In the image-position information-image pickup time database 114, image data 134 picked up by the CCD video camera 102, image data 132 corresponding to position icons to be displayed on a map window, text data 133 to be used to display messages which may be assistance to an operation of the user and such an image information table 135 as shown in FIG. 8 are registered as seen in FIG. 7.

In the image information table 135 illustrated in FIG. 8, a thumbnail ID 136 which is an ID unique to each image data, a latitude-longitude 137 which is information representative of a pickup place and an image pickup date-time 138 are registered.

For example, when a position icon is selected as described above, an inquiry is issued to the image information table 135 using a latitude and a longitude of the position icon data as a key through the position icon selection interface 123. In response to the inquiry, a thumbnail ID or an image pickup date and an image pickup time corresponding to the position icon are searched for.

Further, when a predetermined icon is selected, data of the icon is used to search for a thumbnail ID and image data based on the thumbnail ID through the thumbnail icon input interface 126. It is to be noted that the image information table 135 may additionally register necessary information such as the name, a comment and so forth of each image data.

Subsequently, a processing block configuration of the film window display processing section 112 and the map window display processing section 111 is described with reference to FIGS. 10 to 12 which show a display screen.

Figure 11:
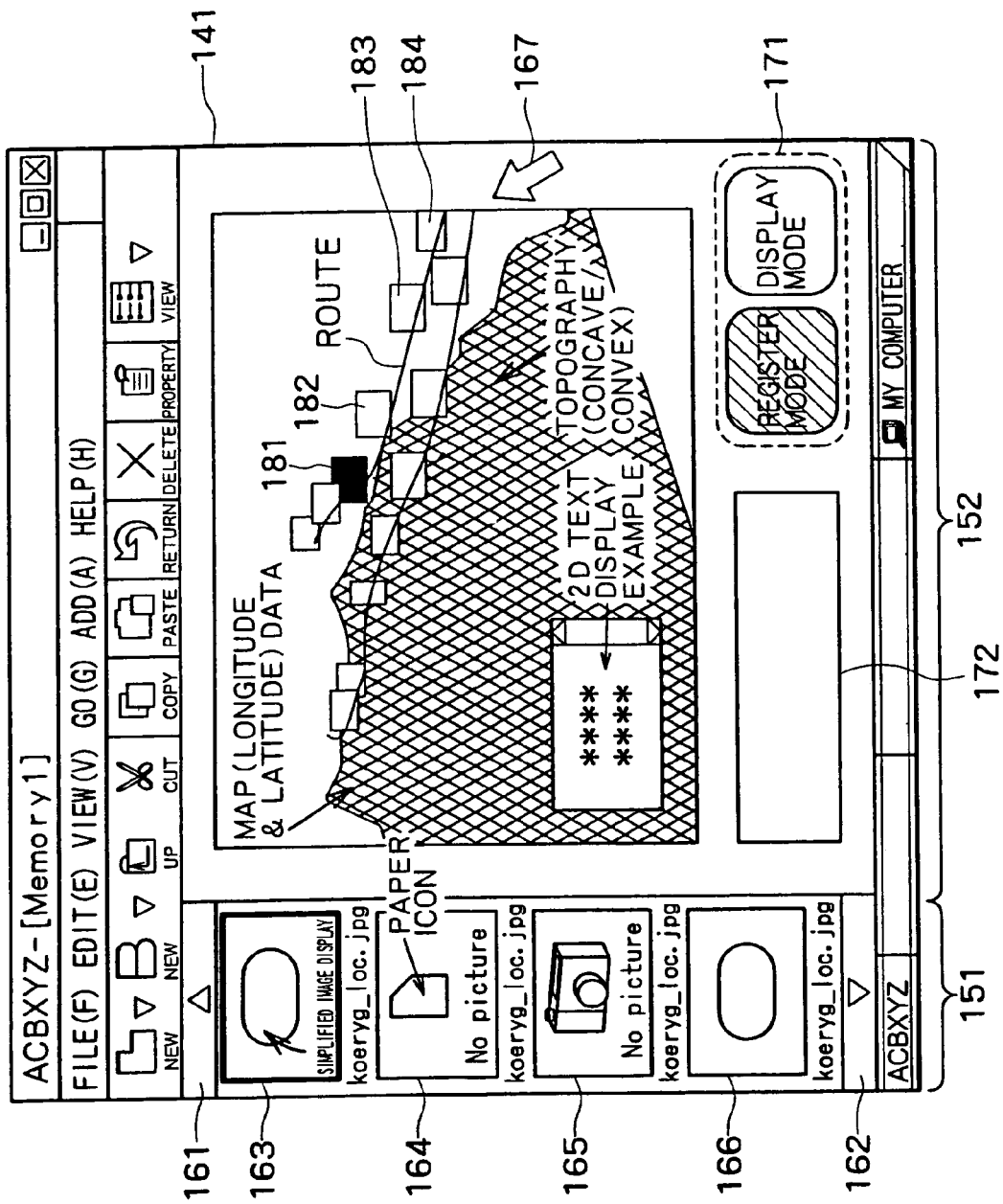
Figure 12:
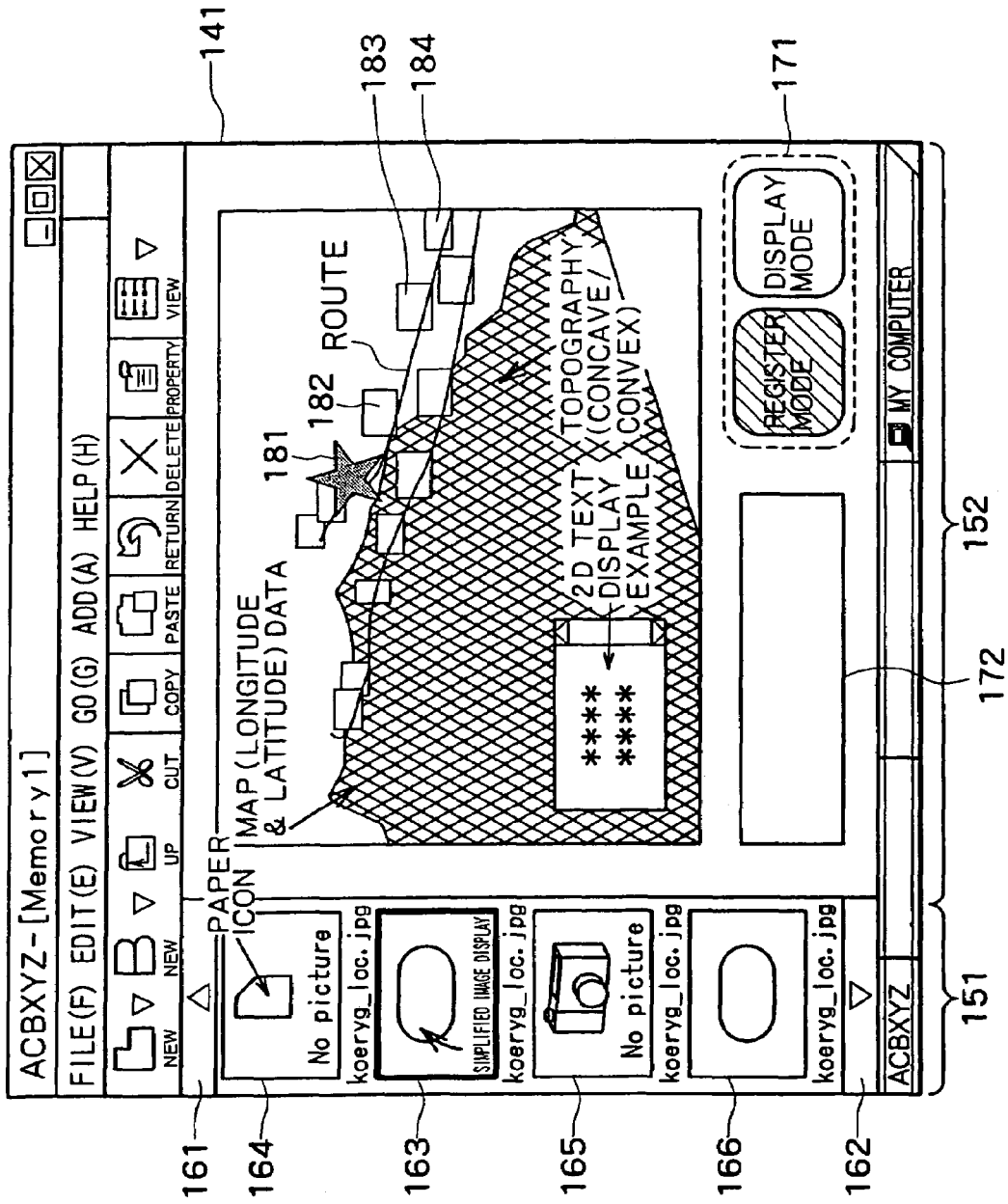

The display screen 141 shown in FIGS. 10 to 12 includes the mode selection buttons 171. The mode selection buttons 171 include a "register mode" button and a "selection mode" button. Further, the display screen 141 includes the film window 151 and the map window 152.

First, an initial screen of the display screen 141 in a state wherein none of image data, position information data and time information data is registered is described. In order to indicate that the icon in the film window 151 is an icon 164 which represents none of image data, position information data and time information data is registered, a paper icon is displayed and also a text of, for example, "No picture" is displayed. Meanwhile, no map image is displayed in the map window 152, but a dummy image prepared in advance such as, for example, a screen of a night sky or a screen of a blue sky is displayed in the map window 152. In the initial screen, only the register mode can be selected.

Now, selection of the "display mode" in mode selection is described. If the display mode is selected, then a predetermined number of thumbnail icons are displayed in a time series in the film window 151. If the upward scroll button 161 or the downward scroll button 162 on the film window 151 is clicked with the mouse cursor 167 to scroll and display predetermined thumbnail icons and then a desired thumbnail icon is clicked, then the desired thumbnail icon is selected.

It is to be noted that the display of thumbnail icons can be scrolled by dragging a thumbnail icon upwardly or downwardly in the film window 151. If a thumbnail icon is doubled clicked, then a corresponding photograph image is displayed in an enlarged scale.

In the map window 152, a map image on which the selected position icon (or a position icon corresponding to the selected thumbnail icon) is centered is displayed three-dimensionally. The displayed map image is based on map data including latitudes and longitudes and topography data formed from contour convex/concave data. It is to be noted that, for an icon for which "No picture" is to be displayed, a position icon may not be displayed.

In the map window 152, a predetermined number of position icons are displayed in a time series in the air portion of the map image. Adjacent ones of the position icons are connected by a route line such that the route line extends through the position icons.

Further, a two-dimensional text display column is displayed on the map image. As contents of the two-dimensional text display, a viewpoint position of the display screen (for example, a viewpoint position of a coordinate system whose base point is set to a south corner of the map data), detailed information (detailed information of an emphatically displayed icon: the title, the date, a comment and so forth), system information (a plotting speed of the map and so forth) and so forth are displayed. The two-dimensional text is displayed in a text display form having a scroll bar.

In the present embodiment, in the initial screen on which none of thumbnail icons or position icons are selected in the "display mode", the thumbnail icons in the film window are displayed in a time series in an ascending order or a descending order (arbitrarily selected by the user) based on registered time information corresponding to the thumbnail icons.

Further, a thumbnail icon whose position information or time information is not registered as yet (only whose image data is registered) is displayed preferentially on the top side. Further, thumbnail icons whose position information or time information is not registered as yet are arranged in an order same as an order in which their image data are registered.

Here, processing when the thumbnail icon 163 is selected is described. If a selection process 118 is performed, then a signal representative of the selected thumbnail icon is inputted to the thumbnail icon input interface 126. The thumbnail icon input interface 126 determines a thumbnail ID corresponding to the selected thumbnail icon based on the signal inputted thereto. Data of the determined thumbnail ID is outputted to the image/latitude and longitude/image pickup time conversion module 127 (refer to FIG. 6).

The image/latitude and longitude/image pickup time conversion module 127 reads out latitude and longitude information corresponding to the selected thumbnail icon from the image-position information-image pickup time database 114. In other words, latitude and longitude information corresponding to the selected thumbnail icon is read out from the image-position information-image pickup time database 114 based on the thumbnail ID inputted, and the latitude and longitude information thus read out is outputted to the map image plotting module 122 of the map window display processing section 111.

The map image plotting module 122 plots a map image based on the latitude and longitude information inputted to the image/latitude and longitude/image pickup time conversion module 127 such that the position of the latitude and the longitude may be positioned at the center of the display image. At this time, map image data, topography data and an effect tool are read out from the map image-topography-lighting effect database 113 in which map data based on which a map is to be plotted is stored, and the read out data are outputted to the map image plotting module 122 so that a map image is plotted.

On the display screen 141, a three-dimensional map image is displayed based on a rough concave/convex topography analogized from the topography data (contour concave/convex data) so that the map image may be observed three-dimensionally. Further, a lighting effect is applied to the map image so that the three-dimensional representation of the topography data may be performed more effectively. The sun is displayed at the start point of lighting, and shadows are displayed on the map image. Consequently, the concave/convex topography is displayed more solidly. At this time, whether the sun is present or not and the location of the sun are set arbitrarily.

The position icon/route line plotting module 121 reads in image data corresponding to the position icon from the image-position information-image pickup time database 114 and simultaneously receives latitude and longitude information corresponding to the selected thumbnail icon from the image/latitude and longitude/image pickup time conversion module 127 through the map image plotting module 122 (or may receive the information directly from the image/latitude and longitude/image pickup time conversion module 127). Then, the position icon/route line plotting module 121 outputs the image data to the position icon represented by the latitude and longitude information.

Further, the image pickup time corresponding to the selected thumbnail icon is read out. Position icons are arrayed and displayed in a time series order in the direction of one axis other than the two axes used for the latitude and longitude display of the position icons displayed in the time series, adjacent position icons are connected to each other in such a display manner that a route line extends through them, and the route line is outputted together with the position icons. Position icons and route lines interconnecting them are displayed at an upper portion (in the air) of the map image.

In this manner, the position icons are not only displayed two-dimensionally in accordance with the latitude and the longitude but also displayed in a time series in the direction of the remaining one axis. It is to be noted that, although a position icon display may be a display of a reduced scale of image data, it may otherwise be a simplified display associated with the image data. For example, if a profile portion of image data (a profile of a human being, a profile of a landscape such as a mountain, a tree or a river, or the like) is displayed, then even if it is a considerably small display, the human being, landscape or the like can be discriminated.

Now, processing when one of position icons is selected in the display mode is described. If a selection process 116 is performed, then a signal representative of the selected position is inputted to the position icon selection interface 123. The position icon selection interface 123 determines an image pickup place (latitude and longitude) corresponding to the selected position icon based on the signal inputted thereto. Then, the image pickup place (latitude and longitude) is inputted to an icon/image pickup time conversion module 124. The icon/image pickup time conversion module 124 reads out image pickup time information corresponding to the selected position icon from the image-position information-image pickup time database 114 based on the image pickup place (latitude and longitude) inputted thereto. The image pickup time information is inputted to the thumbnail icon plotting module 125 of the film window display processing section 112.

The thumbnail icon plotting module 125 reads out a predetermined number of image data picked up around the time information inputted thereto from the icon/image pickup time conversion module 124 from the image-position information-image pickup time database 114 and displays thumbnail icons of the image data in a time series. Further, an image corresponding to the selected position icon is displayed at the position of the top (on the display screen 141, the highest position among the displayed thumbnail icons) of the displayed portion of the film window 151.

Now, processing when the "register mode" is selected in mode selection is described. In the initial state wherein none of image data, position information data and time information data is registered, a paper icon, for example, an icon which includes a text display of "No picture", is selected. Then, image data is registered for the selected icon. Upon such image registration, a thumbnail ID is delivered to the icon.

Upon the registration of image data, for example, an image picked up using the CCD camera built in the personal computer 1 is registered. On the other hand, images picked up using some other image pickup apparatus such as a digital camera which is not built in the personal computer 1 are stored into the image pickup apparatus or a storage medium. Also the image data are inputted to the personal computer 1 and registered into the image-position information-image pickup time database 114.

Now, processing where image data corresponding to a thumbnail icon is registered is described. One of thumbnail icons displayed in the film window 151 is selected. Based on a signal representative of the selected thumbnail icon, a thumbnail ID is inputted to the image-position information-image pickup time database 114 through the thumbnail icon input interface 126.

Then, if position information is not registered as yet for image data corresponding to the selected thumbnail icon (that is, if, upon photographing, current position data is not acquired through reception of signals from GPS satellites using the GPS antenna 108), then a message for urging the user to input an image pickup position is read out from the image-position information-image pickup time database 114, and a message output process 130 is performed through the data input/output control section 115.

If the GPS antenna 108 is connected to the USB port 107 in a state wherein the photograph image management software is operating, then radio waves from GPS satellites are received by the GPS antenna 108 (the connection of the GPS antenna 108 may be performed otherwise before the photograph image management software is started up). Thus, when a photograph (image) is picked up, image pickup position information is registered into the image-position information-image pickup time database 114. In short, position information received by the GPS antenna 108 is stored into the RAM 54 through the USB port 107, south bridge 58 and PCI bus 56, and after a photograph is taken, the photograph image management software is started up and the position information stored in the RAM 54 is read out. The position information is registered into the image-position information-image pickup time database 114 in this manner.

Further, if position information is not registered for the selected icon (irrespective of whether or not image data is registered for the icon), for example, a message "Please register the latitude and the longitude." is displayed in a message display portion 172 in the map window 152 as seen in FIG. 10.

In order to register position information data, the user will drag and drop an icon to a corresponding position icon or an arbitrary position on the map. The position information data can be registered into the image-position information-image pickup time database 114 thereby.

Here, if position information and time information are registered while image data are not registered as yet at the position of an icon, then only a text of, for example, "No picture" is displayed at the icon 165 as seen in FIG. 10, and simultaneously, a camera mark is displayed. Here, depending upon whether a paper icon is displayed or not, it can be discriminated readily whether position information data or time information data is not registered for the icon 164.

If the position icon 116 is selected, then an image pickup position of image data corresponding to the icon is outputted from the image-position information-image pickup time database 114 to the position icon/route line plotting module 121 through the position icon selection interface 123 under the control of the data input/output control section 115. Then, the position icon/route line plotting module 121 outputs image data with which a position icon is to be displayed at a predetermined position on the map.

The inputting of an image pickup position is performed such that, for example, electronic map software is loaded into the application 54Hn (refer to FIG. 5) and then the user inputs an address of the image pickup position on the electronic map software. Otherwise, the electronic map software may be started up on the background to search for position data from an address and input the position data to a predetermined position of an image information table described hereinabove with reference to FIG. 8.

Further, the position of a position icon on a map may be changed by drag-and-drop by a mouse operation. When a position icon is moved, change data of the position data may be inputted to and registered into the image-position information-image pickup time database 114 through the position icon selection interface 123 and latitude and longitude information of a corresponding thumbnail ID may be rewritten.

Any of a large number of registered thumbnail icons or corresponding position icons can be registered particularly as a memory point. By this, the position icon 181 which is a memory point is displayed emphatically or displayed in a special manner, for example, as seen in FIG. 12. In the display example of FIG. 12, a memory point is shown as a star-like display.

Figure 9:
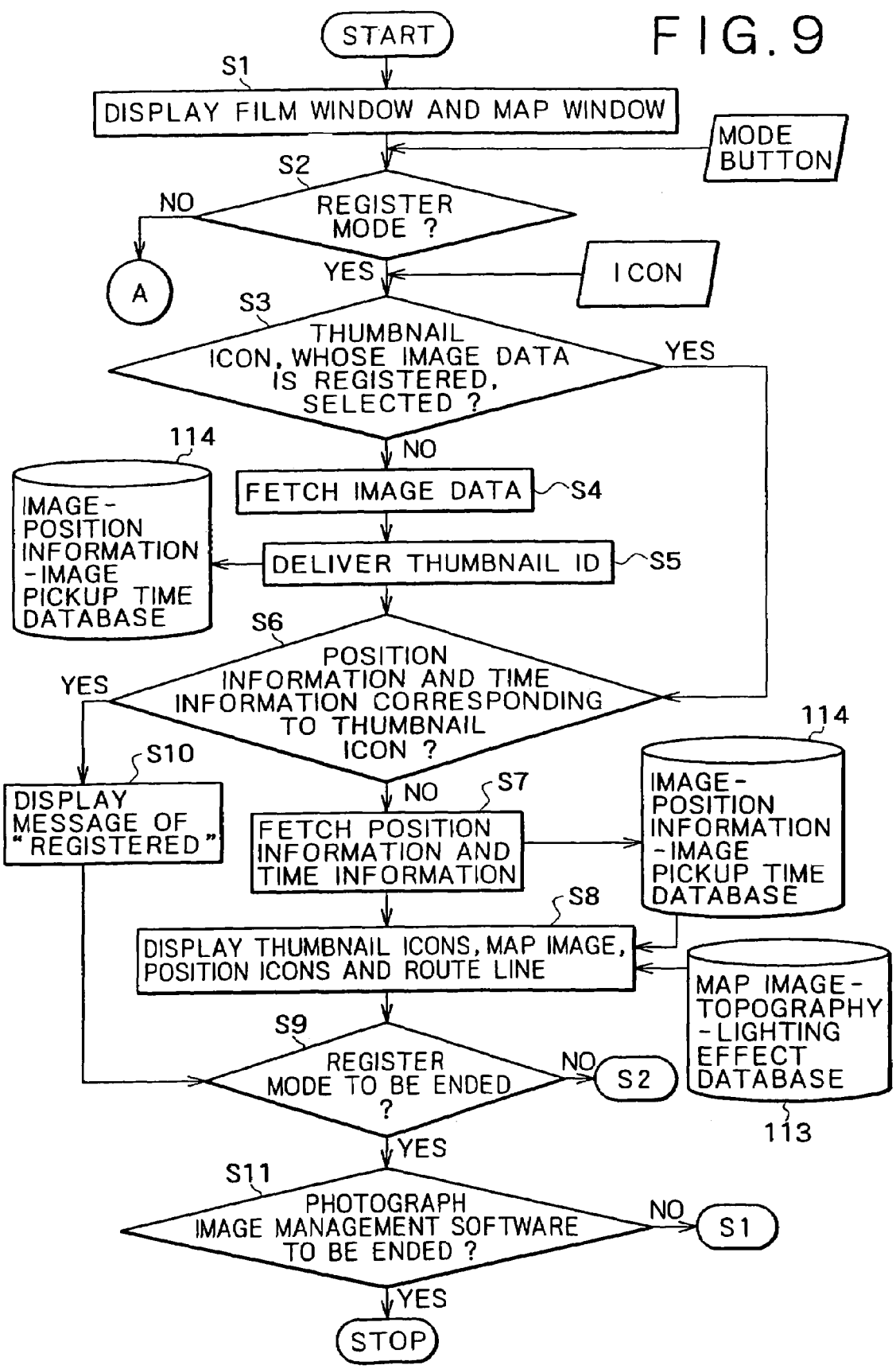
FIG. 9 is a flow chart illustrating a registration process for image data, position information data and time information data.

Now, processing of image data and position information and time information corresponding to the image data is described with reference to a flow chart of a registration process of image data, position information data and time information data illustrated in FIG. 9.

First, if an instruction to start up the photograph image management software is inputted, then the CPU 51 loads the photograph image management software stored on the HDD 67 into the RAM 54 and executes it. The instruction to be started up is inputted, for example, by the user selecting an icon representative of startup of the photograph image management software displayed on the LCD unit 7 using the keyboard 5 or the touch pad 6.

After the photograph image management software is started up, the film window 151 and the map window 152 shown in FIGS. 10 to 12 are displayed on the LCD unit 7 through the south bridge 58, AGP 50 and video controller 57 in step S1. On the display screen, the mode selection buttons 171 are displayed to allow selection of one of the modes. In this instance, in the initial stage wherein no registration data is present, only the register mode can be selected.

In step S2, it is discriminated which one of the mode selection buttons in the film window 151 and the map window 152 displayed in step S1 is selected. Here in step S2, it is illustrated that it is discriminated whether or not the register mode is selected.

In particular, the CPU 51 discriminates based on a signal inputted thereto through the embedded controller 68, ISA/EIO bus 63, south bridge 58, PCI bus 56, north bridge 53 and host bus 52 whether or not the register mode of the mode selection buttons 171 shown in FIGS. 10 to 12 is selected.

If it is not discriminated in step S2 that the register mode is selected (step S2: NO), then the processing advances to a process A (display mode process: refer to FIG. 13).

On the other hand, if it is discriminated in step S2 that the register mode is selected (step S2: YES), then icons are displayed on the film window 151. Then, one of the icons is selected.

Of a predetermined number of icons displayed on the film window 151, those whose position information data or time information data is not registered are preferentially displayed at the top in the film window 151. Such icons are displayed as paper icons. If an icon of a camera mark display has a display of, for example, "No picture" thereon, then this represents that image data is not registered as yet but position information data and time information data are registered already for the icon. Here, only in the initial state wherein no data is registered as yet, a paper icon and "No picture" are displayed.

In step S3, the thumbnail icon input interface 126 discriminates based on a signal of icon data inputted thereto through the PCI bus 56 whether or not image data corresponding to the icon selected by the user using the touch pad 6 or the keyboard 5 is registered already.

If it is discriminated in step S3 that image data corresponding to the selected icon is not registered as yet (step S3: NO), then in step S4, image data to which the icon should correspond (that is, image data for a thumbnail icon) is fetched.

In particular, in step S4, the CPU 51 fetches image data picked up by the CCD video camera 102 or the like onto the HDD 67 through the video controller 57, PCI bus 56, south bridge 58 and IDE bus 62. If the GPS antenna 108 is connected to the USB port 107 when image data is picked up, then radio waves from GPS satellites are received by the GPS antenna 108, and current position data is inputted simultaneously with the image data.

Further, since the USB interface 106 outputs the current position data (latitude data, longitude data and altitude data) received through the GPS antenna 108 and the USB port 107 from the GPS satellites through the PCI bus 56, north bridge 53 and host bus 52, also the current position data can be registered onto the HDD 67 together with the image data.

Further, in order to input an image picked up by an image pickup apparatus other than the CCD video camera 102 or an image where image data is provided already as a file to the notebook type personal computer 1, the image pickup apparatus and the notebook type personal computer 1 may be connected to each other so that image data may be taken into the notebook type personal computer 1, or the image data present as the file may be taken into the notebook type personal computer 1, in step S4.

To the icon whose image data is taken in in step S4, a thumbnail ID is delivered to make the icon a thumbnail icon in step S5. Here, the delivery of a thumbnail ID is performed automatically. If a user ID is delivered newly, then a message representing delivery of a user ID such as "A user ID is delivered." may be presented to the user. Further, where position information data and time information data are registered in connection with a thumbnail icon already, the thumbnail icon has a thumbnail ID delivered thereto already.

Further, in step S5, the image data and the thumbnail ID corresponding to the thumbnail icon are stored into the image-position information-image pickup time database 114.

Then in step S6, the information data in the image-position information-image pickup time database 114 are searched using the thumbnail ID as a key to discriminate whether or not there are position information data and time information data corresponding to the thumbnail icon having the image data.

Similarly, if a thumbnail icon whose image data is registered is selected in step S3 described above (step S3: YES), then the processing advances to step S6, in which it is discriminated whether or not there are position information data and time information data corresponding to the thumbnail icon having the image data.

If it is discriminated in step S6 that position information data and time information data corresponding to the thumbnail icon are not registered (step S6: NO), then in order to register position information data and time information data to correspond to the thumbnail icon, position information data and time information data are fetched into the notebook type personal computer 1 in step S7.

Here, if registration of several position information data and time information data is completed for the position icon, then a map image is displayed in the map window.

In this instance, in order that position information data and time information data may be registered, the data input/output control section 115 reads out the display message of "please register position information and time information." from the image-position information-image pickup time database 114. The message data is outputted to the LCD unit 7 through the north bridge 53, AGP 50 and video controller 57 so that the message is displayed on the message display portion 172 as seen in FIG. 10. Further as seen in FIG. 10, the thumbnail icon 163 selected by the user is displayed in highlight display.

If the user refers to the display message and drags the thumbnail icon 163 selected by the mouse cursor 167 and then moves and drops the thumbnail icon 163 to and at a desired position or a position icon on the map window 152, then a signal representative of the drop position is inputted to the position icon selection interface 123.

Position information data and time information data of the image pickup place are determined from the data inputted to the position icon selection interface 123 in this manner. The position information data and the time information data corresponding to the selected thumbnail icon 163 are registered into the image-position information-image pickup time database 114.

It is to be noted that, as the reading in of position information and time information, the image pickup date and time may otherwise be read onto the HDD 67 from the timer circuit 60 through the IDE bus 62 in step S7.

Where position information and time information have been registered by some other GPS apparatus, the GPS apparatus may be connected so that the position information data and the time information data may be fetched from the GPS apparatus.

In this manner, in step S7, position information and time information corresponding to the thumbnail icon are fetched and stored into the image-position information-image pickup time database 114.

Then in step S8, a position icon and a map image based on the position information data and the time information data are displayed in the map window, and a map image centered at the latitude and the longitude corresponding to the selected thumbnail icon is displayed and the position icon and a route line are displayed. In the film window, the icons are displayed such that the selected thumbnail icon 163 may be at the top of the display array.

Further, position icons are displayed in the air portion in the map image based on position information. Of the position icons displayed in a time series, those position icons which are adjacent each other are connected by a displayed route line.

In step S8, image data is read out from the image-position information-image pickup time database 114, and image data for a thumbnail icon is produced by and outputted form the thumbnail icon plotting module 125 while map image data is read out from the map image-topography-lighting effect database 113.

The map image plotting module 122 produces map image data and outputs a position icon through the position icon/route line plotting module 121. The image data of the thumbnail icon and the map image data as well as the position icon are supplied through the north bridge 53, AGP 50 and video controller 57 to and displayed on the LCD unit 7.

It is to be noted that it is also possible to connect the position icons 181 to 184 displayed on the map window 152 with a connection line such that, for example, a moving means of the user (for example, walking, a bicycle, a car, a bus, an electric car, a ship, an airplane or the line) upon picking up of an image from a position indicated by a certain position icon to another position indicated by a next position icon may be displayed by a displaying method or manner (for example, the design, color, thickness, pattern or the like of the line) which is different depending upon the moving means so that the relationship between the picked up image data may be represented more particularly.

For example, if photograph data picked up during a sightseeing tour are recorded together with moving means, then the photographs can be arranged in association with the sightseeing course in the tour. Also it is possible to search for an image pickup time from the image-position information-image pickup time database 114 using the latitude and the longitude of a position icon as a search key, calculate an average moving time from the distance and the image pickup times represented by two position icons and display the most suitable moving means by default.

Then in step S9, it is discriminated whether or not an instruction to end the register mode is issued by the user. If the register mode is to be continued (step S9: NO), then the processing returns to step S2 so that the register mode can be continued.

On the other hand, if it is discriminated in step S6 that position information data and time information data corresponding to the thumbnail icon are present (step S6: YES), then the data input/output control section 115 fetches a message of "It is registered already." from the image-position information-image pickup time database 114 in step S10. The display message is outputted to the LCD unit 7 through the north bridge 53, AGP 50 and video controller 57.

Then in step S9, the CPU 51 discriminates whether or not an instruction to end the register mode is issued. If it is discriminated that the register mode should be ended, that is, if an operation to end the register mode is performed by the user (step S9: YES), then it is discriminated in next step S11 whether or not an instruction to end the photograph image management software is issued.

If it is discriminated in step S11 that an instruction to end the photograph image management software is not issued (step S11: NO), then the processing returns to step S1. Here, in step S1, the display screen including the film window and the map window is restored, and the register mode or the display mode is selected by the mode selection buttons 171. Thus, the user can change the mode from the register mode to the display mode by selecting the display mode.

On the other hand, if it is discriminated in step S11 that an instruction to end the photograph image management software is issued (step S11: YES), then the processing is ended.

Now, a processing flow of a process A (the display mode) when the display mode is selected by the user (step S2: NO) on the film window 151 and the map window 152 displayed in step S1 is described with reference to FIG. 13.

It is discriminated in step S30 whether or not the instruction inputted by selective operation of the mode selection buttons 171 in the film window 151 and the map window 152 displayed in step S1 is the display mode.

In particular, the CPU 51 discriminates based on a signal inputted thereto through the embedded controller 68, ISA/EIO bus 63, south bridge 58, PCI bus 56, north bridge 53 and host bus 52 whether or not the button representative of the display mode from between the mode selection buttons 171 shown in FIGS. 10 to 12 is selected by the user to select the display mode.

If it is discriminated in step S30 that the instruction is not the display mode (step S30: NO), then the processing returns to step S2 (the register mode). On the other hand, if it is discriminated that the instruction is the display mode (step S30: YES), then it is discriminated whether or not one of thumbnail icons in the film window 151 and position icons in the map window 152 is selected by the user.

In particular, in step S31, the position icon selection interface 123 discriminates based on an input signal inputted thereto through the embedded controller 68, ISA/EIO bus 63, south bridge 58, PCI bus 56 and north bridge 53 by the user using the keyboard 5 or the touch pad 6 whether or not one of the position icons is selected.

If it is discriminated in step S31 that no position icon is selected (step S31: NO), then the processing advances to another process B (process upon selection of a thumbnail icon) illustrated in FIG. 14.

On the other hand, if it is discriminated in step S31 that a position icon is selected (step S31: YES), then the latitude and the longitude corresponding to the selected position icon are called from the image-position information-image pickup time database 114 and extracted in step S32. The position icon selection interface 123 searches for the latitude and the longitude corresponding to the position icon designated by the user from the image-position information-image pickup time database 114 and inputs them to the icon/image pickup time conversion module 124.

In step S33, the icon/image pickup time conversion module 124 issues an inquiry to the image-position information-image pickup time database 114 based on the latitude and the longitude inputted thereto from the position icon selection interface 123 in step S32 to search for the image pickup time of a photograph picked up at the place. The searched out pickup time data is outputted to the thumbnail icon plotting module 125 of the film window display processing section 112.

Then in step S34, those thumbnail icons which possess pickup time data around the searched out image pickup time are called from the image-position information-image pickup time database 114, and a predetermined number of them are extracted. Here, the predetermined number signifies the number of thumbnail icons which can be displayed in the film window 151.

Further, the thumbnail icon plotting module 125 searches the image-position information-image pickup time database 114 using the image pickup time inputted thereto as a key to detect a predetermined number of thumbnail IDs of image data picked up around the image pickup time and searches for corresponding image data.

In step S35, image data corresponding to the position icons are extracted from the image-position information-image pickup time database 114. If image data is not registered as yet, then as a corresponding icon, for example, a camera mark and the text display of "No picture" are displayed on the icon. On the other hand, if corresponding image data is registered, then image data is displayed as a corresponding thumbnail icon.

Then in step S36, a predetermined number of thumbnail icons including the thumbnail icon corresponding to the selected position icon are displayed in a time series in the film window 151. At this time, the thumbnail icon corresponding to the selected position icon from among the predetermined number of thumbnail icons displayed in a time series in step S36 is displayed at the top of the time series array in step S37.

Further, in step S38, the thumbnail icon corresponding to the selected position icon is emphatically displayed in the film window 151. As such emphatic display, for example, highlight display or thick line display of an outer framework of the thumbnail icon is used as seen in FIG. 11.

Then in step S39, it is discriminated whether or not an instruction to end the display mode is issued by the user. If the display mode is to be continued (step S39: NO), then the display mode is selected continuously in step S30.

On the other hand, if it is discriminated that an instruction to end the display mode is issued by the user (step S40: YES), then it is discriminated in step S40 whether or not an instruction to end the photograph image management software is issued by the user.

If it is discriminated in step S40 that an instruction to end the photograph image management software is not issued (step S40: NO), then the processing returns to step S1 illustrated in FIG. 9. Thus, the display screen of the film window 151 and the map window 152 is restored in step S1, and the register mode or the display mode is selected by means of the mode selection buttons 171. Here, the user can operate the button for the register mode to change the mode to the register mode.

On the other hand, if it is discriminated in step S40 that an instruction to end the photograph image management software is issued (step S40: YES), then the processing is ended.

Now, a processing flow of the process B when it is discriminated in step S31 that none of the position icons is selected (step S31: NO) and consequently one of the thumbnail icons is selected is described with reference to FIG. 14.

In step S50, the thumbnail icon input interface 126 discriminates based on an input signal inputted thereto through the embedded controller 68, ISA/EIO bus 63, south bridge 58, PCI bus 56 and north bridge 53 by the user using the keyboard 5 or the touch pad 6 whether or not one of the thumbnail icons is selected. If it is discriminated in step S50 that none of the thumbnail icons is selected (step S50: NO), then the processing returns to step S31.

On the other hand, if it is discriminated in step S50 that one of the thumbnail icons is selected (step S50: YES), then in step S51, the thumbnail icon input interface 126 extracts a thumbnail ID corresponding to the thumbnail icon designated by the user from the image-position information-image pickup time database 114 and inputs the thumbnail ID to the image/latitude and longitude/image pickup time conversion module 127.

In step S52, the image/latitude and longitude/image pickup time conversion module 127 searches the image-position information-image pickup time database 114 using the thumbnail ID inputted thereto from the thumbnail icon input interface 126 in step S51 to discriminate whether or not an image pickup place (a latitude and a longitude) data corresponding to the thumbnail icon is present.

If it is discriminates in step S52 that latitude and longitude data corresponding to the thumbnail icon is not detected (step S52: NO), then the position icon/route line plotting module 121 outputs a signal representing that no image pickup place has been searched out to the data input/output control section 115 in step S53.

The data input/output control section 115 receives the signal, reads out text data corresponding to a message of, for example, "Please register position information and time information" from the image-position information-image pickup time database 114, and outputs the text data to the LCD unit 7 through the north bridge 53, AGP 50, and video controller 57. After the message is displayed on the LCD unit 7, the processing returns to step S7 for the register mode process illustrated in FIG. 9.

On the other hand, if an image pickup place (latitude and longitude) is searched out in step S52 (step S52: YES), then the image/latitude and longitude/image pickup time conversion module 127 outputs the searched out latitude and longitude to the map image plotting module 122 in step S54. The map image plotting module 122 reads out, based on the latitude and the longitude inputted thereto, map image data centered at the inputted latitude and longitude from the map image-topography-lighting effect database 113 and outputs the map image data to the position icon/route line plotting module 121. Further, three-dimensional display of a topography is performed based on contour data. Lighting is used as one of screen effects. The sun may be displayed at the start point of the lighting.

In step S55, the position icon/route line plotting module 121 extracts a predetermined number of position icons including the corresponding position icon from the image-position information-image pickup time database 114, displays a map image centered at the image pickup place corresponding to the thumbnail icon designated by the user, and displays the position icons 181 to 184 in a time series in the map window 152. Further, the position icon 181 corresponding to the selected thumbnail icon 163 is emphatically displayed by highlight display or the like as seen in FIG. 10.

Further in step S56, route line data with which adjacent ones of the position icons are connected by a route line are produced and outputted to the LCD unit 7 through the north bridge 53, AGP 50 and video controller 57 so that the data is displayed on the screen.

Then in step S57, it is discriminated whether or not an instruction to end the display mode is issued. If the display mode should be continued (step S57: NO), then the display mode is selected continuously in step S30.

However, if an instruction to end the display mode is issued by the user (step S57: YES), then the CPU 51 discriminates in step S58 whether or not an instruction to end the photograph image management software is issued.

If it is discriminated in step S58 that an instruction to end the photograph image management software is not issued (step S58: NO), then the processing returns to step S1 illustrated in the processing flow of FIG. 9. Thus, in step S1, the display screen of the film window 151 and the map window 152 is restored, and the register mode or the display mode is selected by means of the mode selection buttons 171. Thus, the user can selectively operate the mode selection buttons 171 to change the mode to the register mode.

Figure 13:
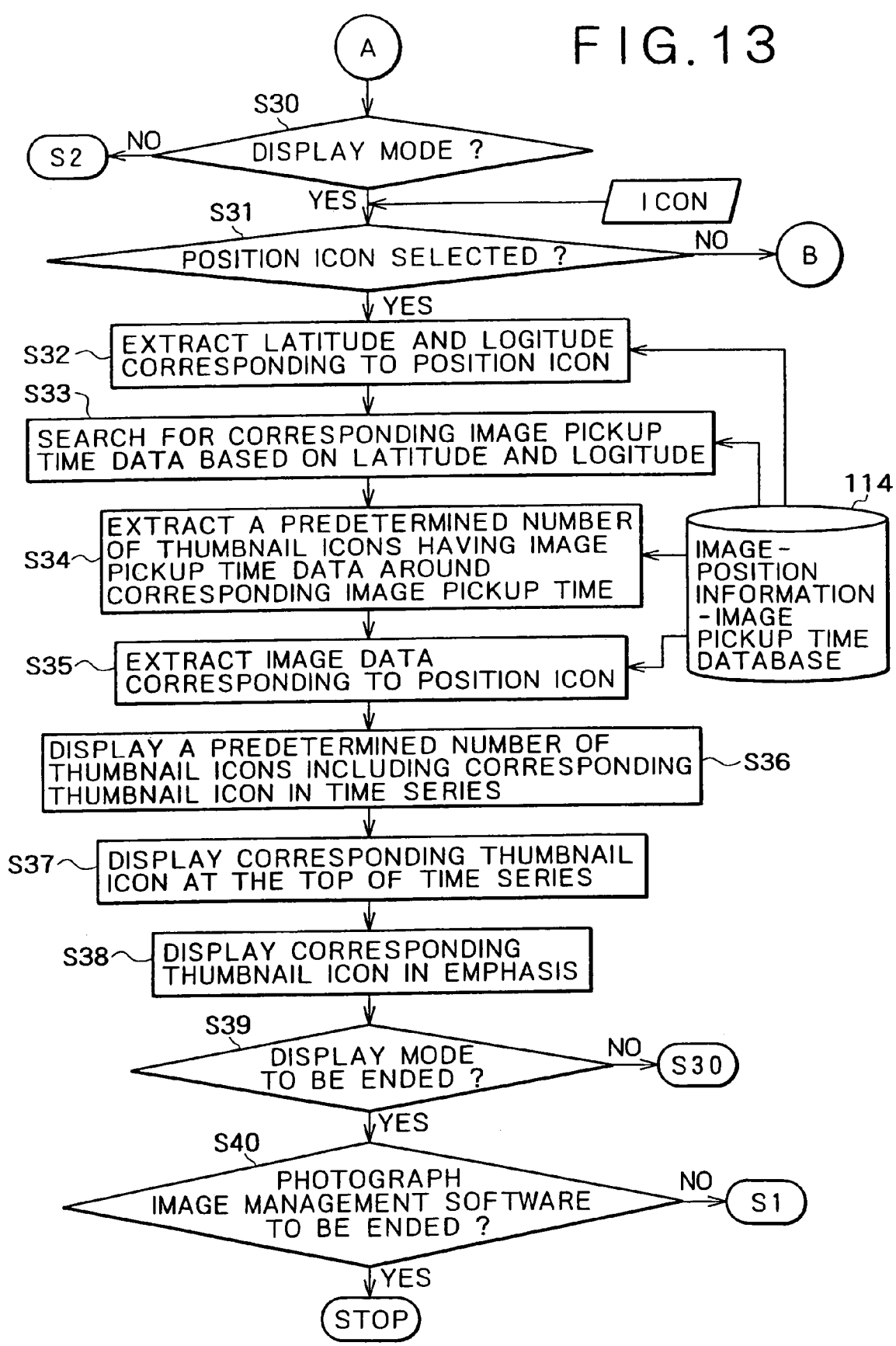
FIG. 13 is a flow chart illustrating a display process when a position icon is selected.
Figure 14:
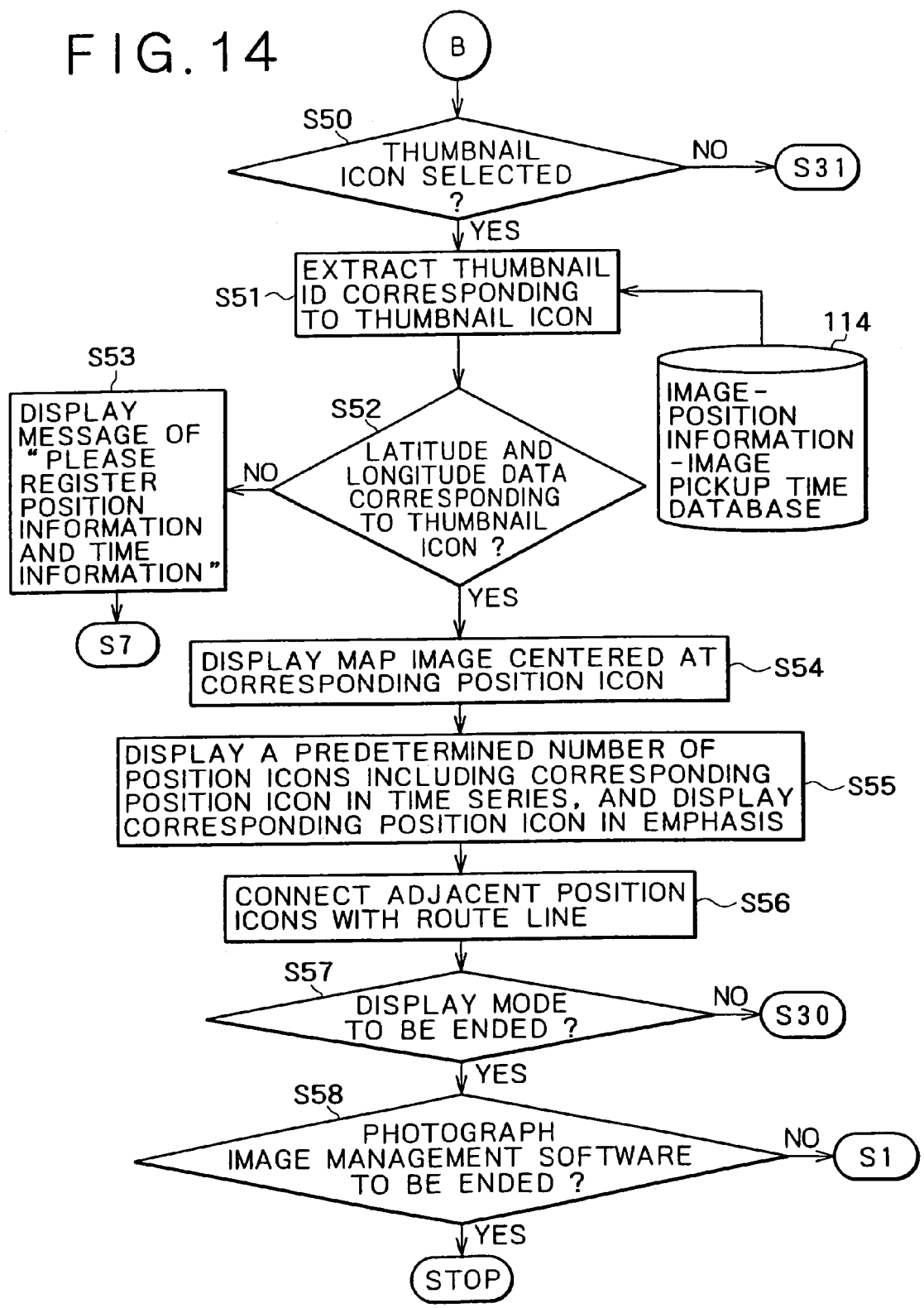
FIG. 14 is a flow chart illustrating a display process when a thumbnail icon is selected.

On the other hand, if it is discriminated in step S58 that an instruction to end the photograph image management software is issued (step S58: YES), then the processing is ended. Such processing as illustrated in FIGS. 9, 13 and 14 is performed in such a manner as described above by the photograph image management software.

It is to be noted that the display scale of the position icons shown in FIGS. 10 to 12 can be set variously. For example, by keeping the cursor key depressed while the shift key of the keyboard 5 is depressed, the position icons can be enlarged or contracted around the position of the mouse cursor 167.

Further, also it is possible to display the position icons 181 to 184 on the map window 152 and display the thumbnail icon 163, which corresponds to the position icon 181 displayed in highlight display, in highlight display as seen in FIG. 12. Adjacent ones of the position icons are connected by a route line, and the position icons and the route line are displayed in the air portion above the map image.

The amount of movement on the map is calculated in accordance with an instruction of the CPU 51 based on an input signal from an inputting apparatus (here the keyboard 5), and concave/convex data of the topography to be displayed for the movement are stored into a memory (for example, the RAM 54). Thus, a stored album (which includes a route, a card, memory points, map data, topography data and so forth) to be observed is converted into three-dimensional log viewer data.

The data are supplied to the RAM 54, and as contents to be displayed on the display apparatus (LCD unit 7), a map to be displayed in concave/convex display and thumbnail icons and a connecting line associated with the map are displayed on the LCD unit 7 in response to an input signal from the inputting apparatus 5. The thumbnail icons and the map displayed in concave/convex display can be displayed from various directions and enjoyed.

The display of a map moves based on absolute coordinates. Here, the absolute coordinates are not coordinates of a display position on the display screen but absolute coordinates in a region in which the map or a thumbnail icon moves. The absolute coordinates of each icon or the map is data of position information (for example, G treks) stored in advance and a map in the form of digital data linked to the position information data.

In short, while the displaying process of a map and display of thumbnail icons are controlled to control movement of the map and the thumbnail icons, the absolute coordinates of the map and the thumbnail icons are read out from the memory and displayed at any time. However, it is otherwise possible to arithmetically operate an area of a map which can be displayed and apply coordinates in the area with reference to a predetermined position.

Further, as an operation of the display screen 141, the viewpoint may be moved automatically or manually. For example, as automatic movement of the viewpoint, it is possible to provide a switch for switching to automatic movement of the viewpoint or a resetting function to an initial camera position or angle such that parallel movement of the viewpoint (in this instance, no variation of the camera angle is involved) in the X, Y or Z direction or variation of the camera angle (in this instance, no change of the camera position is involved) may be performed.

Now, movement is described more particularly. For example, in the present embodiment, predetermined keys of the keyboard are allocated to the movement. However, operation means (which may be, for example, a control stick) which can be operated in directions of the x axis and the y axis perpendicular to each other and defining a horizontal plane in a three-dimensional space or in directions of the horizontal plane and the z axis perpendicular to the horizontal plane may be used instead. Here, description is given of a case wherein a predetermined key is used.

For leftward or rightward movement, a leftward arrow mark key or a rightward arrow mark key of the predetermined keys is operated and thus serves as first changing means for changing an image in the horizontal direction of the display apparatus.

For movement in the depthwise direction (ZOOM-IN or ZOOM-OUT), the "W" key of the predetermined keys is operated for the ZOOM-IN but the "S" key is operated for the ZOOM-OUT, and they serve as second changing means for changing an image in the depthwise direction of the display apparatus.

For upward or downward movement (SLIDE), an upward arrow mark key of the predetermined keys is operated for the upward movement, but a downward arrow mark key is operated for the downward movement, and they serve as third changing means for changing an image in the vertical direction of the display apparatus.

For rolling movement (clockwise ROLL), the numeral keys "9" and "7" are used as the predetermined keys; for upward and downward pitching (PITCH), the numeral keys "8" and "2" are used as the predetermined keys; and for leftward and rightward yawing (YAW), the numeral keys "4" and "6" are used as the predetermined keys, to perform respective processes. It is to be noted that the predetermined keys may be allocated in a different manner.

An operation of any of the predetermined keys is detected, and a corresponding displaying process is performed. For example, if it is discriminated that an operation for a horizontal direction is detected, then the CPU 51 controls the map image plotting module 122, position icon/route line plotting module 121 and so forth to output 119 of a map, position icons and a route line to move the map and thumbnail icons being currently displayed in the direction allocated to the predetermined key. In other words, the map and thumbnail icons being currently displayed are moved in the leftward or rightward direction of the display apparatus.

If the predetermined key for the rightward direction is operated, then the map is moved in the rightward direction, but if the predetermined key for the leftward direction is operated, then the map is moved in the leftward direction. If the map is moved in the leftward direction, also the thumbnail icons are moved in the leftward direction. In this manner, a process of moving a map and thumbnail icons is performed in response to an operation of any of the predetermined keys.

Figure 15:
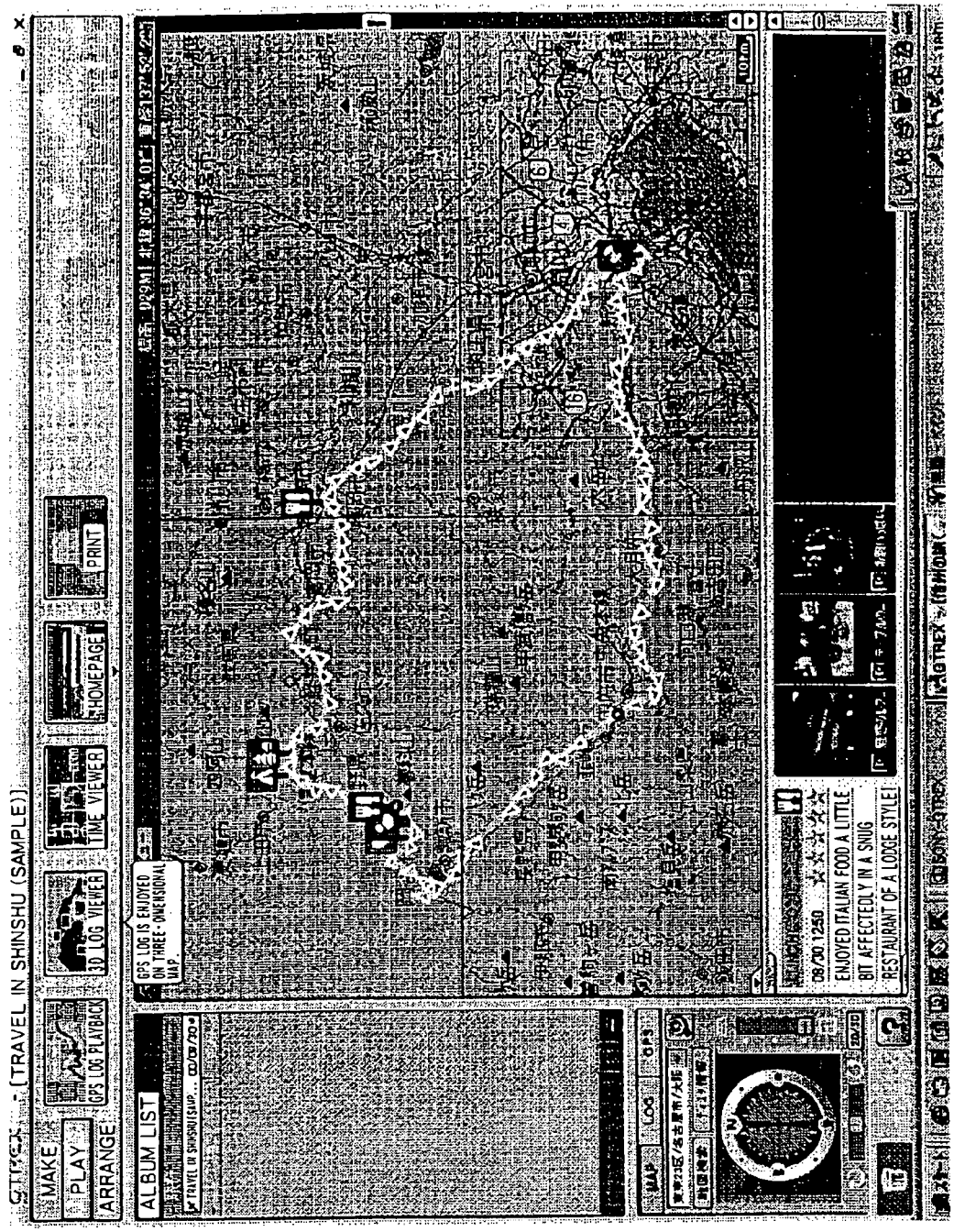
FIG. 15 is a schematic view showing a map display including a display selection screen.

This is described more particularly with reference to FIG. 15 to 19. If a "Play" button is selected in a state wherein such a map as shown in FIG. 15 is displayed on the LCD unit 7, then a selection button for a three-dimensional log viewer is displayed. If the three-dimensional log viewer is selected, then an album (which includes a route, a card, memory points, map data, topography data and so forth) selected and stored in advance is converted into three-dimensional log viewer data.

Figure 16:
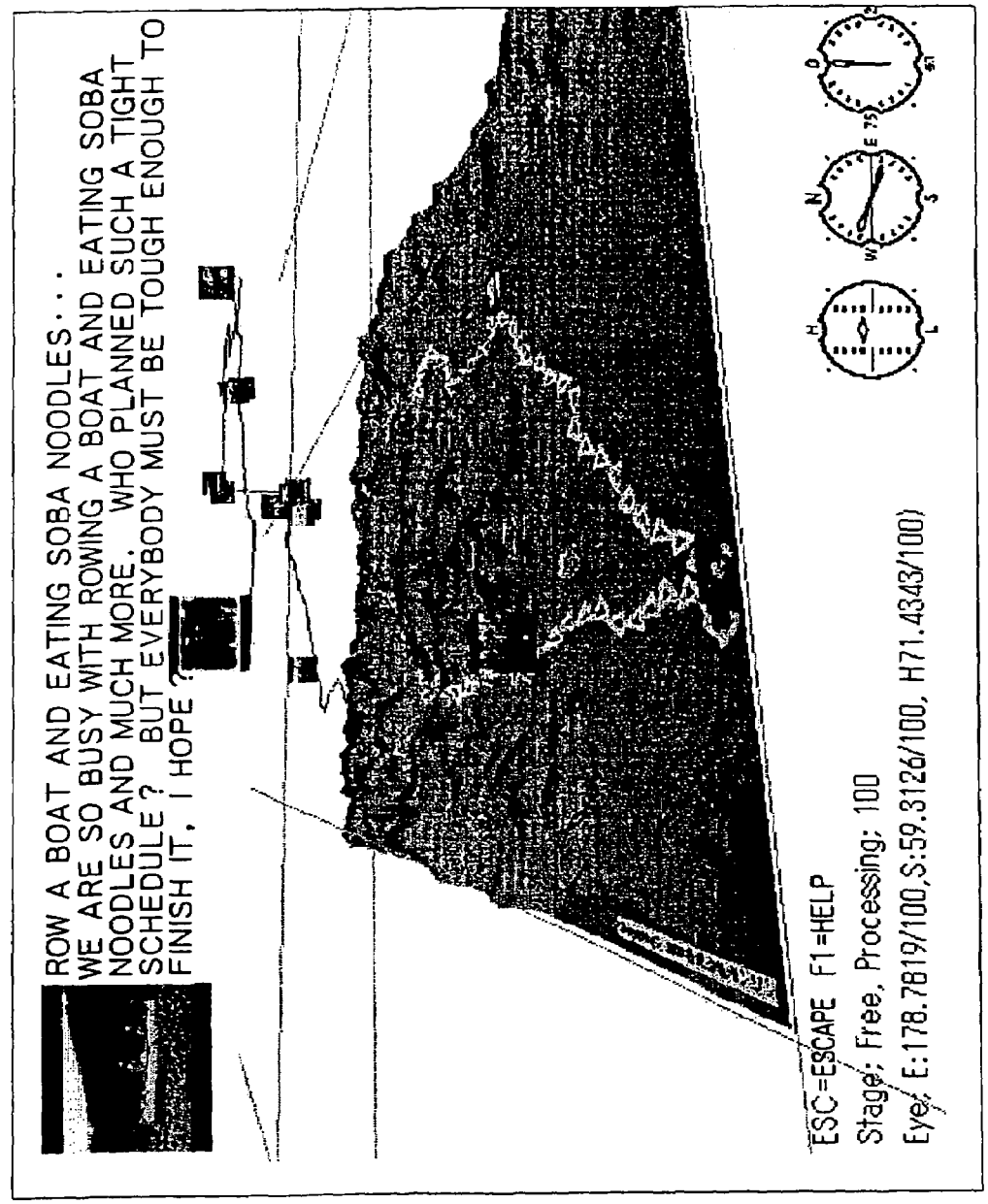
FIGS. 16 to 19 are schematic views showing different examples of display.

Then, the data obtained by the conversion are displayed on the LCD unit 7. For example, such a screen as shown in FIG. 16 is displayed, and the user can operate such predetermined keys as described hereinabove to operate the display position or the movement on the displayed screen such as leftward or rightward movement (horizontal movement), upward or downward movement (vertical movement), clockwise or counterclockwise rolling movement, upward or downward pitching movement, or leftward or rightward yawing movement. In this instance, a map of concave/convex display and thumbnail icons are displayed and a route line interconnecting them is displayed in the air portion on the map. The thumbnail icons are displayed in perspective.

Figure 17:
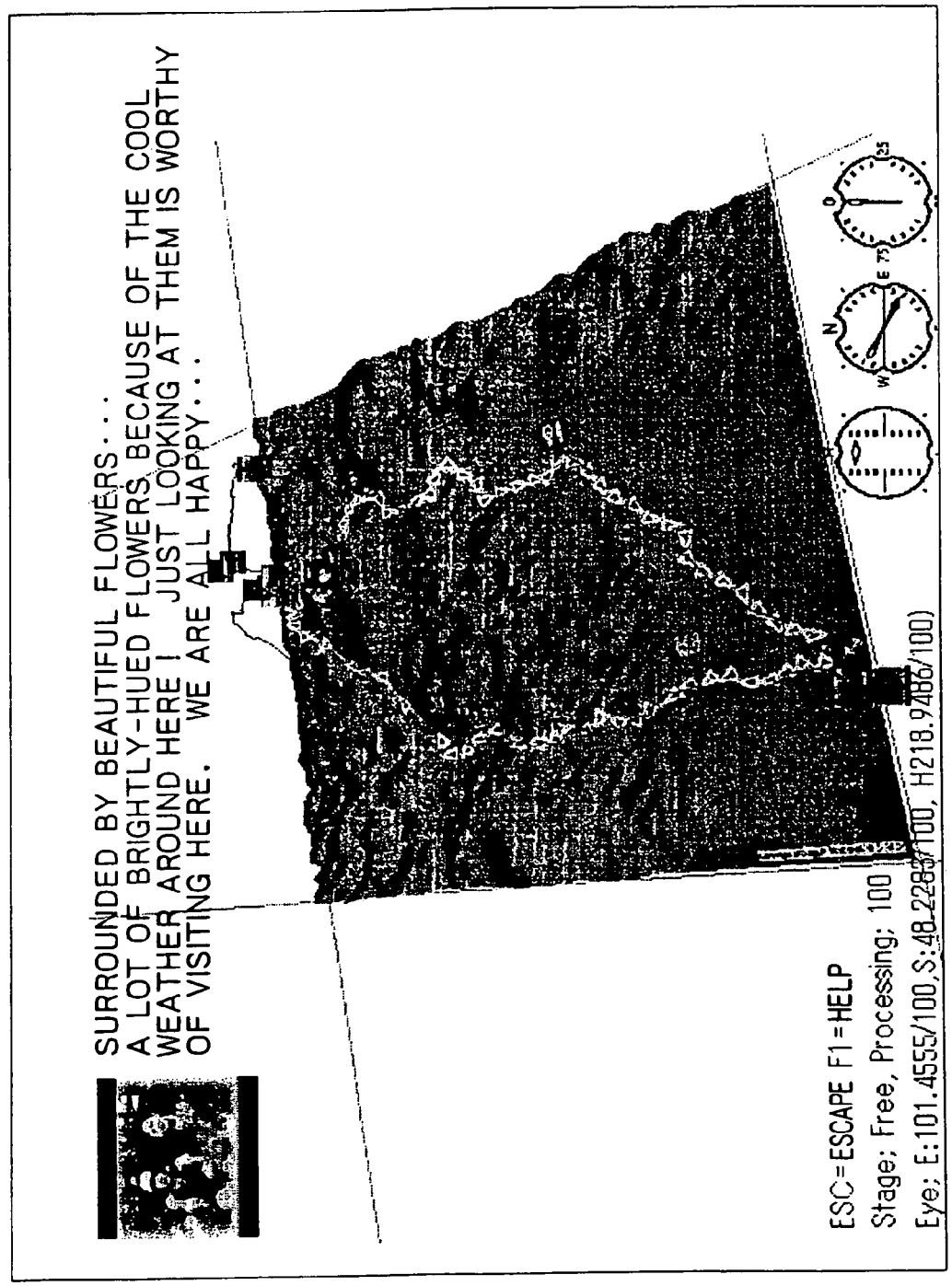
Figure 18:
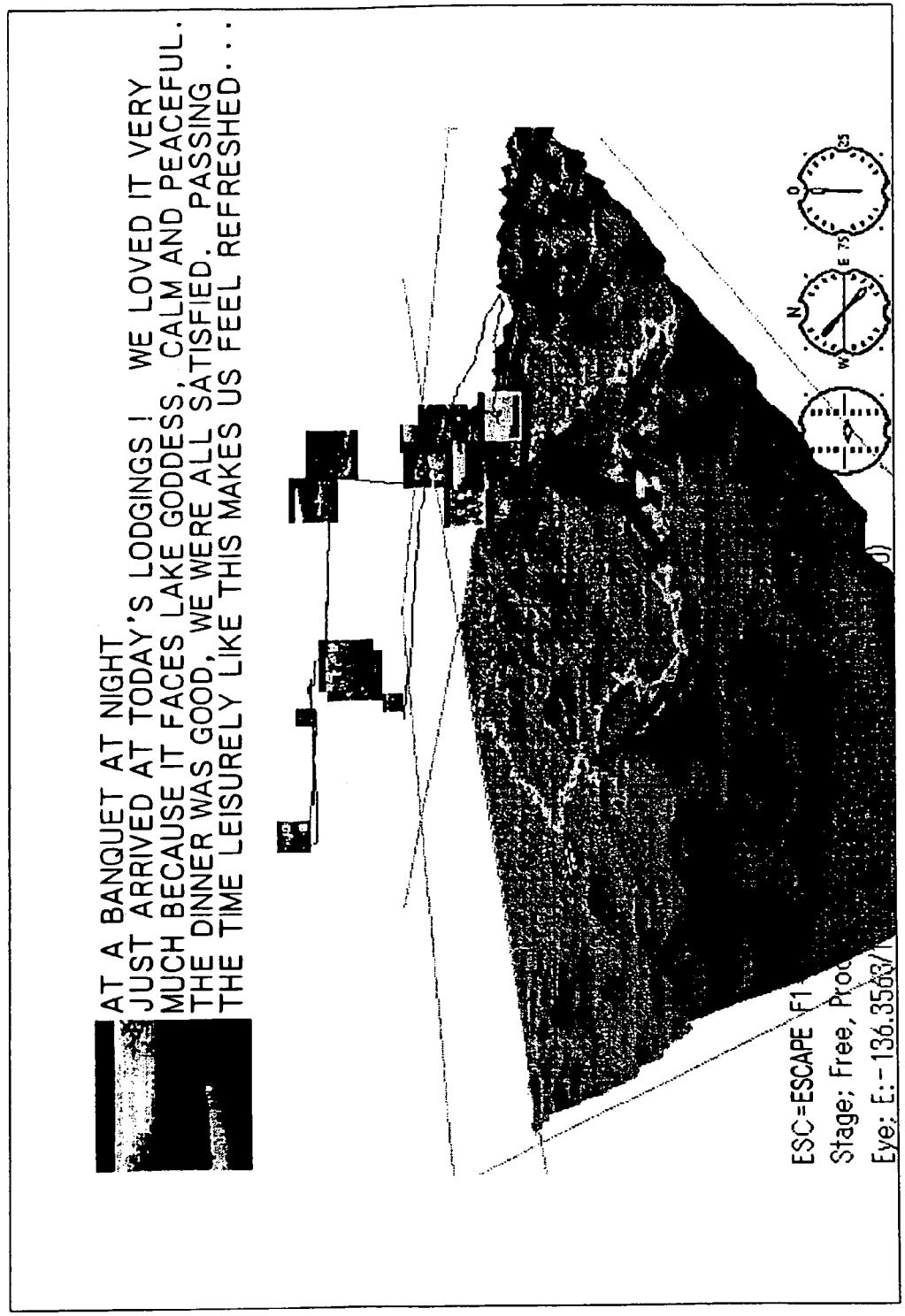
Figure 19:
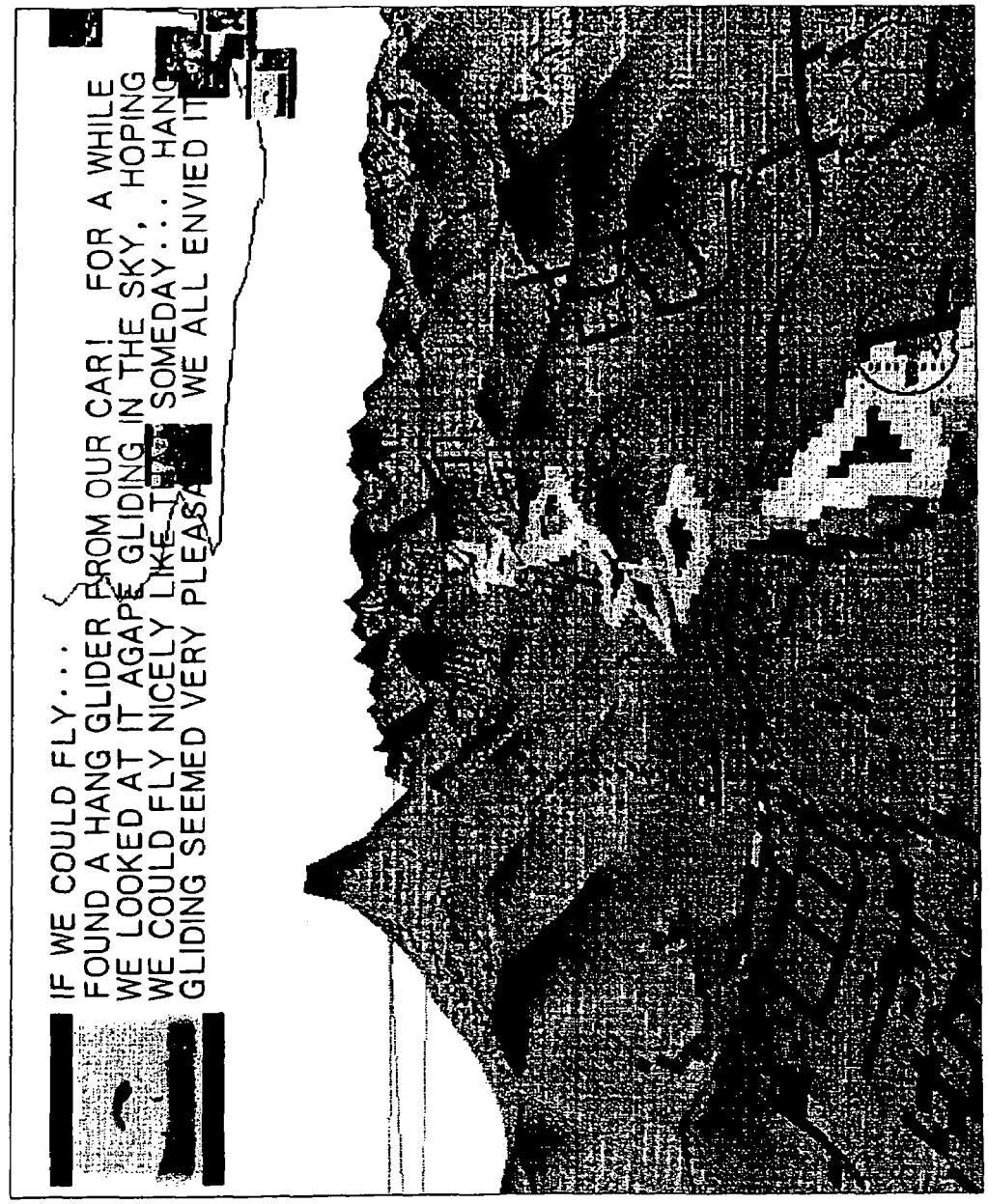

Further, if one of the predetermined keys, for example, the space key, is operated once, then the display of FIG. 16 changes to such a display as shown in FIG. 17 wherein the plane of the map is observed from the upper air. Then, if the space key is operated once again, then the display further changes such that the viewpoint approaches the topography while turning as seen in FIG. 18, and further, such a screen as shown in FIG. 19 which displays the topography in an increasing scale along the route of the log of the position information is displayed. Thus, a display full of variations can be enjoyed by successively performing such operations as described above. It is to be noted that, if a thumbnail icon is selected on any of the screens, then a text (comment) and so forth associated with the thumbnail icon can be displayed. Further, an operation guide, the direction, the altitude, an automatic display elapsed time and so forth are displayed like meters on the display section.

If an operation key of the inputting apparatus is operated to display a display screen in an enlarged or reduced scale, then the enlarged display is realized by inserting dots uniformly whereas the reduced display is realized by omitting dots uniformly. Thus, the displayed state can be changed to obtain an arbitrary enlarged or reduced scale favorable to the user by moving the viewpoint toward or away from the topography or the thumbnail icons. It is to be noted that the method for achieving enlarged or reduced display is not limited to such insertion or omission of dots as described above.

As described above, for manual movement of the viewpoint, it is possible to use the keyboard 5 or the touch pad 6 to perform such operations as the depthwise movement ZOOM, the leftward or rightward movement SLIDE, the upward or downward movement SLIDE, the clockwise or counterclockwise movement ROLL, the upward or downward pitching movement PITCH and the leftward or rightward yawing movement YAW and set element keys corresponding to the operations on the keyboard 5 in order to perform the operations.

In this instance, for the manual movement of the viewpoint, it is possible to eliminate adjustment of the field of vision of the map image to be displayed. This makes it possible for the user to look at the map image from a favorable place in a favorable angle. In this instance, in order to prevent the user position from being lost in the field of vision, an origin may be set such that, when the user position comes to the origin, a particular camera position may be restored while a camera angle is set wherein the map image is displayed such that a portion thereof at which a route line is displayed is positioned at the center of gravity.

Further, the user position may be moved gradually such that, when a fixed time elapses, while the camera position is maintained, the camera angle is set so that the image is displayed such that the portion of the map image at which a route line is displayed comes to the center of gravity. Further, when a fixed time elapses, the manual movement of the viewpoint may be changed over to automatic movement of the viewpoint.

Furthermore, in addition to a map image, thumbnail icons, position icons and a route line which are displayed three-dimensionally, for example, text data may be displayed as two-dimensional data. Such text data may be displayed in regard to, for example, viewpoint position information or detailed information of an icon displayed in highlight display in such a manner as illustrated as a 2D text display example in FIGS. 10 to 12.

As described above, the thumbnail icon 163 and so forth and the position icons 181 to 184 can be displayed in a manner associated with each other on the screen. The position icons indicate position information on a plane defined by two axes representing the latitude and the longitude and indicate a time series array in a direction of the remaining one axis, and image data represented by each of the position icons includes image pickup time information. Therefore, the user can discriminate readily when and where stored image data was picked up. Also where a plurality of photographs were taken at the same place, the corresponding relationship between the image pickup place indicated on the map and the photograph image data can be represented intelligibly. Also it is possible to use an image pickup place as a key to search for the picked up image data and the image pickup date readily.

While the series of processes described above can be executed by hardware, it may otherwise be executed by software. Where the series of processes is executed by software, a program which constructs the software is fetched as a program by communication or some other means or installed from a program storage medium into a computer incorporated in hardware for exclusive use or, for example, a personal computer for universal use which can execute various functions by installing various programs.

The program installed into a computer and placed into an executable state by the computer is obtained through a communication circuit including the Internet, or the program storage medium for storing programs is formed as a package medium such as, as shown in FIG. 5, a magnetic disk 231 (including a floppy disk), an optical disk 232 (including a CD-ROM (Compact Disk-Read Only Memory) and a DVD (Digital Versatile Disk)), a magneto-optical disk 233 (including an MD (Mini-Disc)), or a semiconductor memory 234, or as a ROM 71 or a hard disk of a HDD 67 on which a program is stored temporarily or permanently. It is to be noted that storage of the program into the program storage medium may be recorded on the program storage medium in advance or may be performed making use of the Internet 80 or a wired or wireless communication medium such as a local area network or a digital satellite broadcast.

It is to be noted that, in the present specification, the steps which describe the program recorded in or on a program storage medium may be but need not necessarily be processed in a time series in the order as described, and include processes which are executed parallelly or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
   a notebook-type portable personal computer including:
   display means forming a movable cover of the portable personal computer;
   image data inputting means for inputting image data;
   time information inputting means for inputting time information in connection with said image data;
   position information inputting means for inputting position information in connection with said image data;
   map display control means for controlling display of a 3D map image;
   position icon display control means for controlling display of position icons indicative of said time information and said position information on the 3D map image whose display is controlled by said map display control means;
   concave/convex display control means for controlling topographic concave/convex display of the 3D map image whose display is controlled by said map display control means, wherein said map display control means changes a viewpoint of the 3D map image in response to pitch and yaw information entered by a user;
   thumbnail icon display control means for controlling a display of thumbnail icons indicative of said image data;
   position icon data inputting means for inputting data representative of said position icons; and
   said thumbnail icon display control means controlling a sequential time series display of the thumbnail icons in response to said time information corresponding to the data representative of the position icons inputted by said position icon data inputting means and in response to the changing 3D map viewpoint, wherein the thumbnail icons are displayed so as to float above the 3D map image.

2. The information processing apparatus according to claim 1, further comprising thumbnail icon data inputting means for inputting data representative of said thumbnail icons, said map display control means controlling a display region of the map image based on said position information corresponding to the data representative of the thumbnail icons inputted by said thumbnail icon data inputting means.

3. The information processing apparatus according to claim 1, wherein said concave/convex display control means for controlling the topographic concave/convex display of said map image controls the topographic concave/convex display based on contour data of a topography.

4. The information processing apparatus according to claim 1, wherein said concave/convex display control means for controlling the topographic concave/convex display of said map image controls the topographic concave/convex display based on arbitrary illumination direction data and shadow data associated with the arbitrary illumination direction data.

5. The information processing apparatus according to claim 1, further comprising:
   position icon time series display control means for controlling a time series display of said position icons in said map image based on said time information; and connection line display control means for controlling a connection line display between a plurality of said position icons.

6. The information processing apparatus according to claim 3, wherein the map image whose display is controlled by said map display control means and a thumbnail icon display displayed on said map image by said thumbnail icon display control means are moved by at least one of horizontal movement, vertical movement, clockwise or counterclockwise rolling movement, upward or downward pitching movement and leftward or rightward yawing movement.

7. The information processing apparatus according to claim 5, wherein the map image whose display is controlled by said map display control means and a thumbnail icon display displayed on said map image by said thumbnail icon display control means are moved by at least one of horizontal movement, vertical movement, clockwise or counterclockwise rolling movement, upward or downward pitching movement and leftward or rightward yawing movement.

* * * * *